United States Patent [19]
Boisvert et al.

[11] Patent Number: 6,064,165
[45] Date of Patent: May 16, 2000

[54] POWER WINDOW OR PANEL CONTROLLER

[75] Inventors: Mario P. Boisvert, Reed City; Stephen R. W. Cooper, Tustin; John Washeleski, Reed City, all of Mich.

[73] Assignee: Nartron Corporation, Reed City, Mich.

[21] Appl. No.: 08/736,786

[22] Filed: Oct. 25, 1996

Related U.S. Application Data

[63] Continuation of application No. 08/275,107, Jul. 14, 1994, which is a continuation-in-part of application No. 07/872,190, Apr. 22, 1992, abandoned.

[51] Int. Cl.$^7$ ..................................... G05B 5/00
[52] U.S. Cl. .................. 318/465; 318/466; 318/476; 388/815; 388/833; 388/903
[58] Field of Search ..................... 318/264–266, 318/280–286, 460–470, 565, 626, 434, 139, 474–477; 388/815, 833, 903; 701/36, 49

[56] References Cited

U.S. PATENT DOCUMENTS

| | | | |
|---|---|---|---|
| 4,514,670 | 4/1985 | Fassel et al. . | |
| 4,608,637 | 8/1986 | Okuyama et al. | 318/466 X |
| 4,641,067 | 2/1987 | Iizawa et al. | 318/287 |
| 4,673,848 | 6/1987 | Hagiwara et al. . | |
| 4,686,598 | 8/1987 | Herr . | |
| 4,730,152 | 3/1988 | Foust et al. . | |
| 4,746,845 | 5/1988 | Mizuta et al. | 318/286 |
| 4,823,059 | 4/1989 | Compeau . | |
| 4,870,333 | 9/1989 | Itoh et al. | 318/286 |
| 4,980,618 | 12/1990 | Milnes et al. . | |
| 5,038,087 | 8/1991 | Archer et al. . | |
| 5,069,000 | 12/1991 | Zuckerman . | |
| 5,081,586 | 1/1992 | Barthel et al. | 364/424.05 |
| 5,131,506 | 7/1992 | Mizuno et al. . | |
| 5,140,316 | 8/1992 | DeLand et al. | 364/424.05 |
| 5,162,711 | 11/1992 | Heckler | 318/264 |
| 5,204,592 | 4/1993 | Huyer . | |
| 5,218,282 | 6/1993 | Duhame . | |
| 5,278,480 | 1/1994 | Murray . | |
| 5,334,876 | 8/1994 | Washeleski et al. | 307/10.1 |
| 5,399,950 | 3/1995 | Lu et al. | 318/565 |
| 5,432,413 | 7/1995 | Duke et al. | 318/139 |
| 5,497,326 | 3/1996 | Berland et al. . | |
| 5,525,876 | 6/1996 | Filippi | 318/282 |
| 5,530,329 | 6/1996 | Shigematsu et al. | 318/469 |
| 5,539,290 | 7/1996 | Lu et al. | 318/565 |
| 5,729,104 | 3/1998 | Kamishima et al. . | |
| 5,734,245 | 3/1998 | Terashima et al. . | |
| 5,832,664 | 11/1998 | Tajima et al. | 318/434 X |

FOREIGN PATENT DOCUMENTS

| | | |
|---|---|---|
| 581509A1 | 2/1994 | European Pat. Off. . |
| 2502679 | 10/1982 | France . |
| 2189906A | 11/1987 | United Kingdom . |
| WO92/20891 | 11/1992 | WIPO . |

OTHER PUBLICATIONS

NHTSA notice published Apr. 16, 1991 in the Federal Register Issuing a final rule Amending Standard No. 118.

*Primary Examiner*—Brian Sircus
*Attorney, Agent, or Firm*—Watts, Hoffmann, Fisher & Heinke, Co., L.P.A.

[57] ABSTRACT

A controller for energizing a power-operable element, such as a sunroof, window, door, vehicle seat, a component of a major appliance or of a machine or of a conveyor system. The disclosed controller senses both hard and soft obstructions and de-activates or otherwise alters operation of a motor that drives the element when an obstruction is detected. The controller can also be used to actuate a brake. The controller senses obstructions during start-up of the motor and regulates the speed of the power-operable element by pulse width modulating motor energization signals.

32 Claims, 15 Drawing Sheets

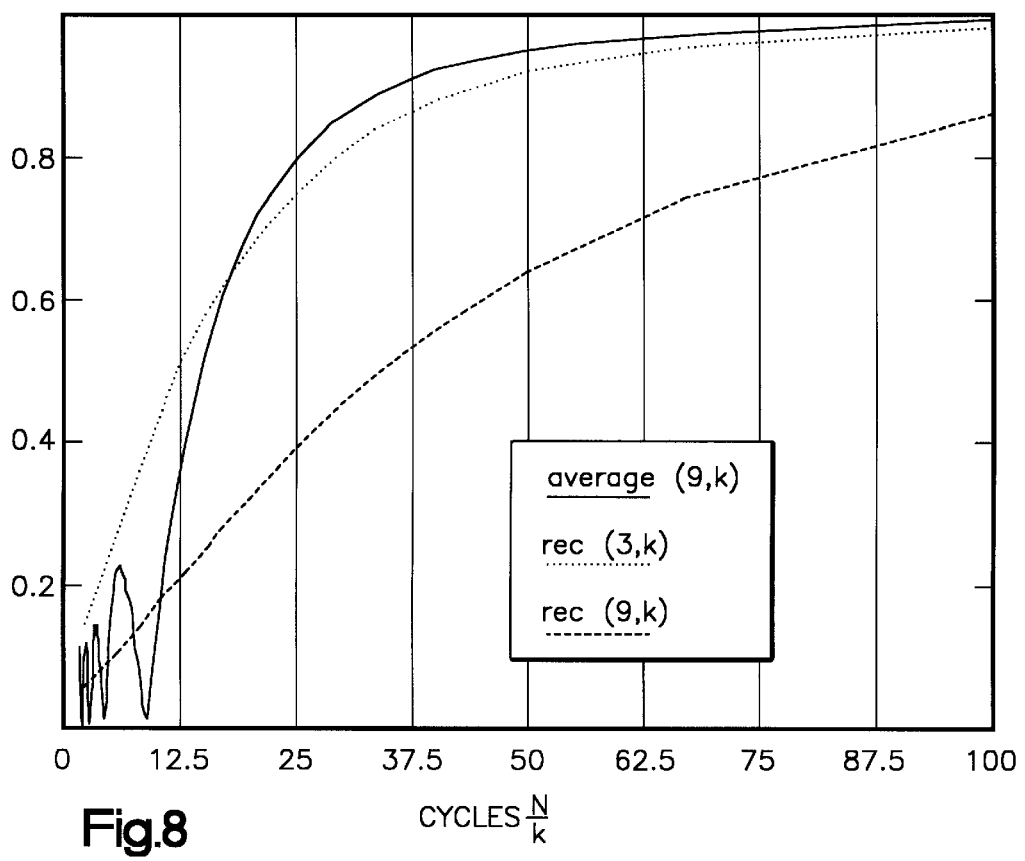
Fig.8  CYCLES $\frac{N}{k}$
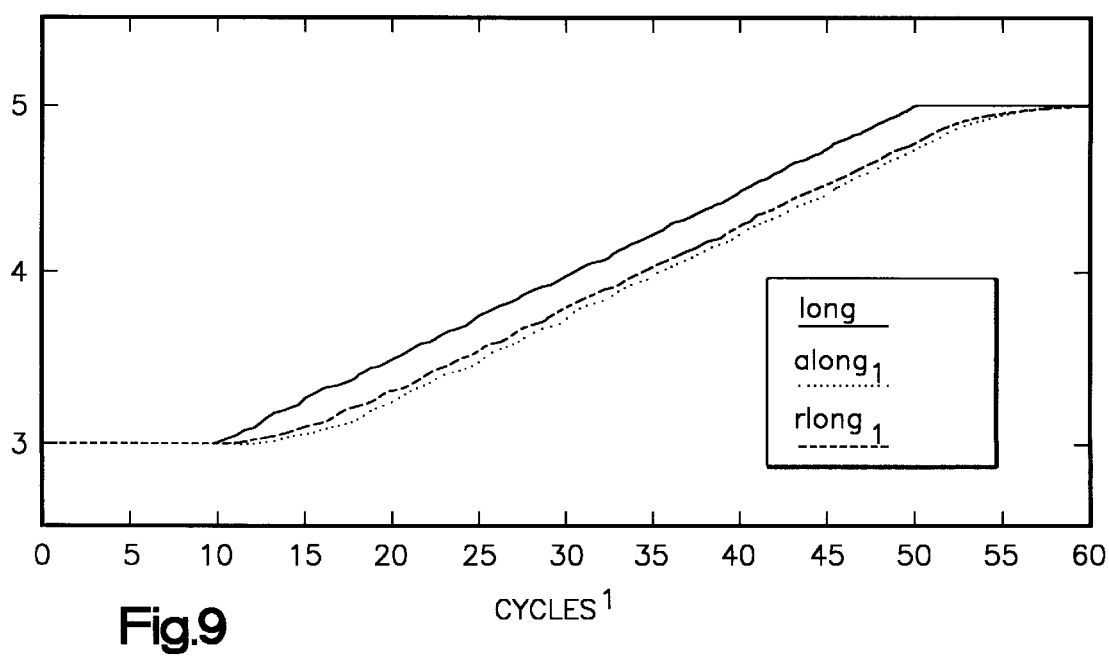
Fig.9  CYCLES$^1$

POWER WINDOW OR PANEL CONTROLLER

CROSS-REFERENCE TO RELATED APPLICATION

This application is a continuation of application(s) Ser. No. 08/275,107 filed on Jul. 14, 1994, which is a continuation-in-part of U.S. Ser. No. 07/872,190 filed Apr. 22, 1992.

FIELD OF THE INVENTION

The present invention concerns a control system for use in activating a motor driven window or panel. One example of such a window or panel is a motor vehicle sunroof. More broadly, the present invention concerns a control system for use in activating a servo motor driving a device that would have the potential for entrapping objects such as human body parts, vehicles or animals. Examples would include automatic doors, powered seats, powered beds, powered windows, conveyor belts and powered safety restraint systems.

BACKGROUND ART

National Highway Traffic Safety Administration Standard 118 contains regulations to assure safe operation of power operated windows. Standard 118 has been amended to apply to power operated roof panels. It establishes requirements for power window control systems located on the vehicle exterior and for remote control devices. The purpose of the standard is to minimize the risk of personal injury that could result if a limb is caught between a closing power operated window and the window frame. The changes to Standard 118 become effective Sep. 1, 1992. Amended Standard 118 states that the maximum force allowable during an auto closure is to be less than 22 pounds onto a solid cylinder having a diameter of between 4 and 200 millimeters.

Certain problems have been identified with operation of existing power window controls. One problem is an undesirable shutdown of the power window control. It is also desirable to detect a soft obstruction in the window travel path as well as a hard obstruction. The gasket area of the window which avoids water seepage into the vehicle can present a problem to the design of a power window control, since the window or panel encounters different resistance to movement in the gasket region. An additional problem is detection of an obstruction when the motor is first activated.

Powered devices such as power windows, power seats and power doors have the potential for entrapment when operating. Entrapment, as noted above, is a safety issue that has been addressed by the National Highway Safety Administration (NHTSA Standard 118) and other agencies. For instance, sunroof panels on automobiles have been required to stop and re-open if they strike a hard cylindrical shaped object upon closure. Elevator doors are designed to re-open if an obstruction such as an arm is encountered upon closure. Domestic washing machines and dryers simply power-OFF when open in an attempt to prevent entrapment. Existing safety systems utilize contact sensors such as the movable obstruction detection panel in elevator door systems, monitoring of closure velocity (Milnes et al., U.S. Pat. No. 4,980,618) and monitoring of absolute motor current draw (Compeau et al., U.S. Pat. No. 4,823,059) among others.

Problems in the existing systems include:
1. Difficulties in detecting both hard and soft obstructions as in motor current and speed sensing. A hard obstruction such as a human head or wheel chair will cause an abrupt and easily detectable change in current draw or closure speed. A softer obstruction such as a human neck, human abdomen or a bundled child will not result in as rapid a change in current draw or closure speed. In such cases, the controller may deliver an injurious amount of closure force before the obstruction is detected, if it is detected at all. On the other hand, more sensitive controllers that sense soft obstructions can be fooled into detecting false obstructions by gradual changes in mechanical load due to wear or climate. They can also have difficulty when soft components such as flexible sealing gaskets are in the system
2. Failure to hit pressure-sensing components such as the movable panel in an elevator door. A hand partially inserted into an elevator door that misses the movable elevator panel used for obstruction detection will be entrapped and can be injured if the closure force is high enough.
3. Failure of passive systems such as the motor shut-off when a washing machine is in spin mode includes the fact that the tub is still spinning when opened and could still cause injury.
4. Low-torque systems designed to deliver limited and safe closure force can still entrap or strangle at comparatively low-force levels or jam when closure force requirements increase due to wear.

DISCLOSURE OF THE INVENTION

The present invention provides method and apparatus for controlling operation of motor vehicle power window systems as well as power roof panels. The control system of the invention includes a sensor, which provides absolute position, speed and direction of movement, and a control circuit for controllably activating a motor to move a window or panel.

In accordance with one embodiment of the invention, the control circuit activates the motor to move a window or panel along a travel path and deactivates the motor if an obstacle is encountered by the window or panel. Striking an obstruction causes the motor current to rise since the energy supplied by the battery is no longer dissipated in rotating the motor shaft. A motor sense circuit coupled to the control circuit senses the motor current as the motor moves the window or panel along its travel path.

In accordance with one aspect of the invention, the control circuit monitors motor current from the motor sense circuit and times a start-up interval each time the motor is energized. The control circuit compares sensed motor current after the start-up interval with a predetermined motor current and stops the motor if the sensed motor current exceeds the predetermined motor current. This will detect an attempt to start movement with an obstruction next to the window or panel.

In accordance with an additional aspect of the invention, the control circuit monitors and saves an indication of motor current vs. position during a calibrating sequence. As the motor moves the window or panel subsequent to the calibration sequence, the control circuit compares sensed motor current with motor currents sensed during the calibration sequence. If too large a deviation in motor current is sensed, the control circuit stops the motor. This technique enables a close enough comparison between measured and "typical" current profiles to detect small changes in current vs. position, such as are generated when a soft obstruction is present. Furthermore, the soft obstruction can often be detected before full actuator force and possible injury or damage is applied to the soft obstruction.

The control circuit updates the profile of current vs. position as the window or panel is opened and closed. This updating assures that as the window or panel drive mechanism changes with use, the control circuit maintains an up-to-date profile for detecting obstructions. Additionally, the controller applies a low-order "software" bandpass filter to the measured current vs. position profile to isolate high-frequency current vs. time transients caused by hard obstructions. The controller then separately tests (from the profile comparison) for high-frequency transients from the filtered profile to detect the presence of hard obstructions.

Thus, the present invention overcomes the disadvantages of the prior art by utilizing both soft and hard obstruction detection and utilizing an "averaging" process to keep up with the changing operating force characteristics that can occur over time.

These and other features of the invention are described below in the best mode for practicing the invention, which is described in conjunction with the accompanying drawings.

BRIEF DESCRIPTION OF THE DRAWINGS

FIG. 8 is a graph of a fraction of adaptation of Algorithms from equations (1) and (6) as a function of the number of cycles with "a" set to 3 (dotted line), "M" set to 9 and the "$a_{j,i}$" set to ⅑ (solid) and with "a" set to 9 (dashed);

FIG. 9 is a graph of actual current (solid), algorithm (6) predicted current (dashed) and algorithm (1) predicted current (dotted) for a slowly changing load profile;

BEST MODE FOR PRACTICING THE INVENTION

Figure 1A:
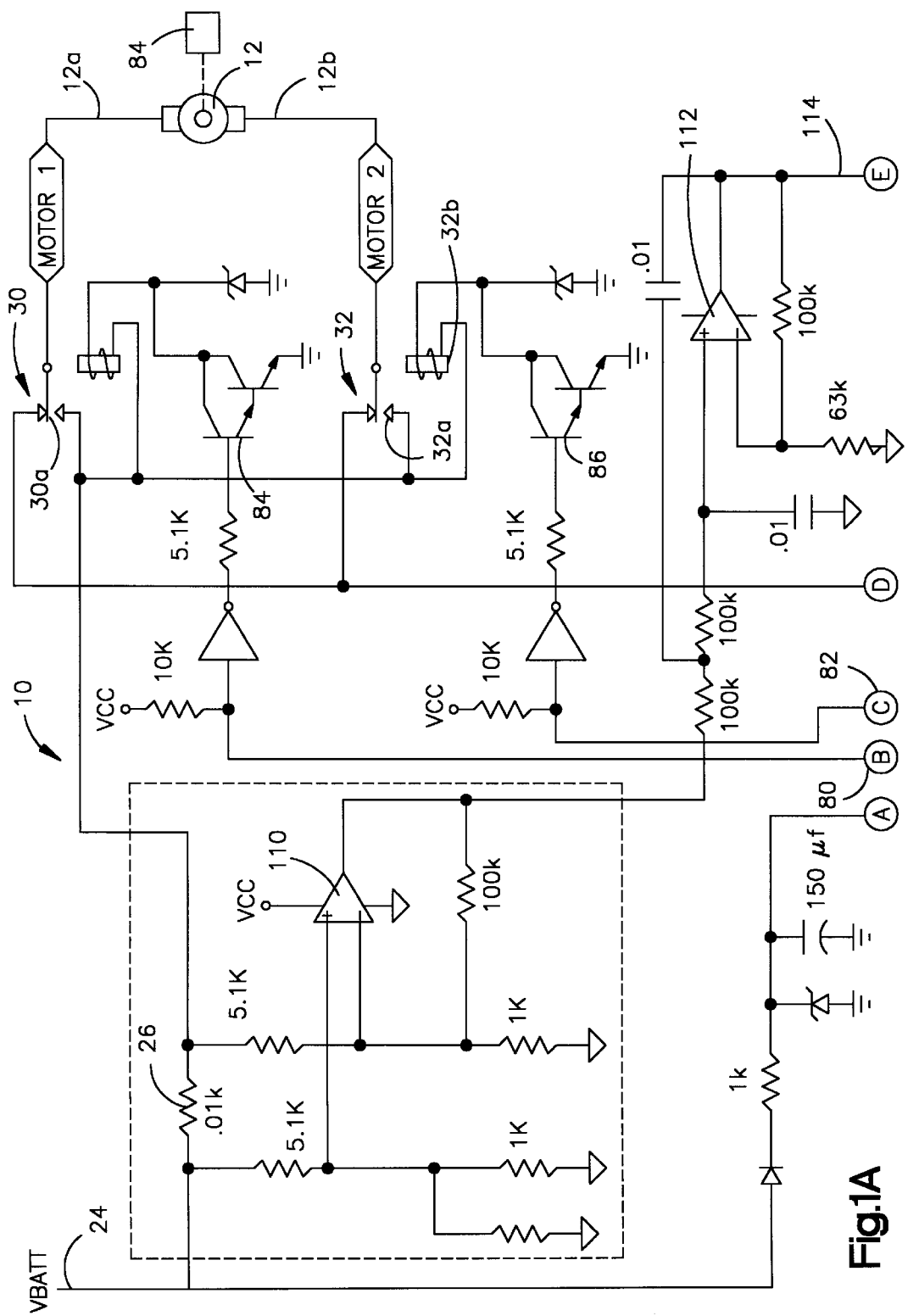
FIGS. 1A and 1B are schematics of a power window or panel control circuit constructed in accordance with the present invention.
Figure 1B:
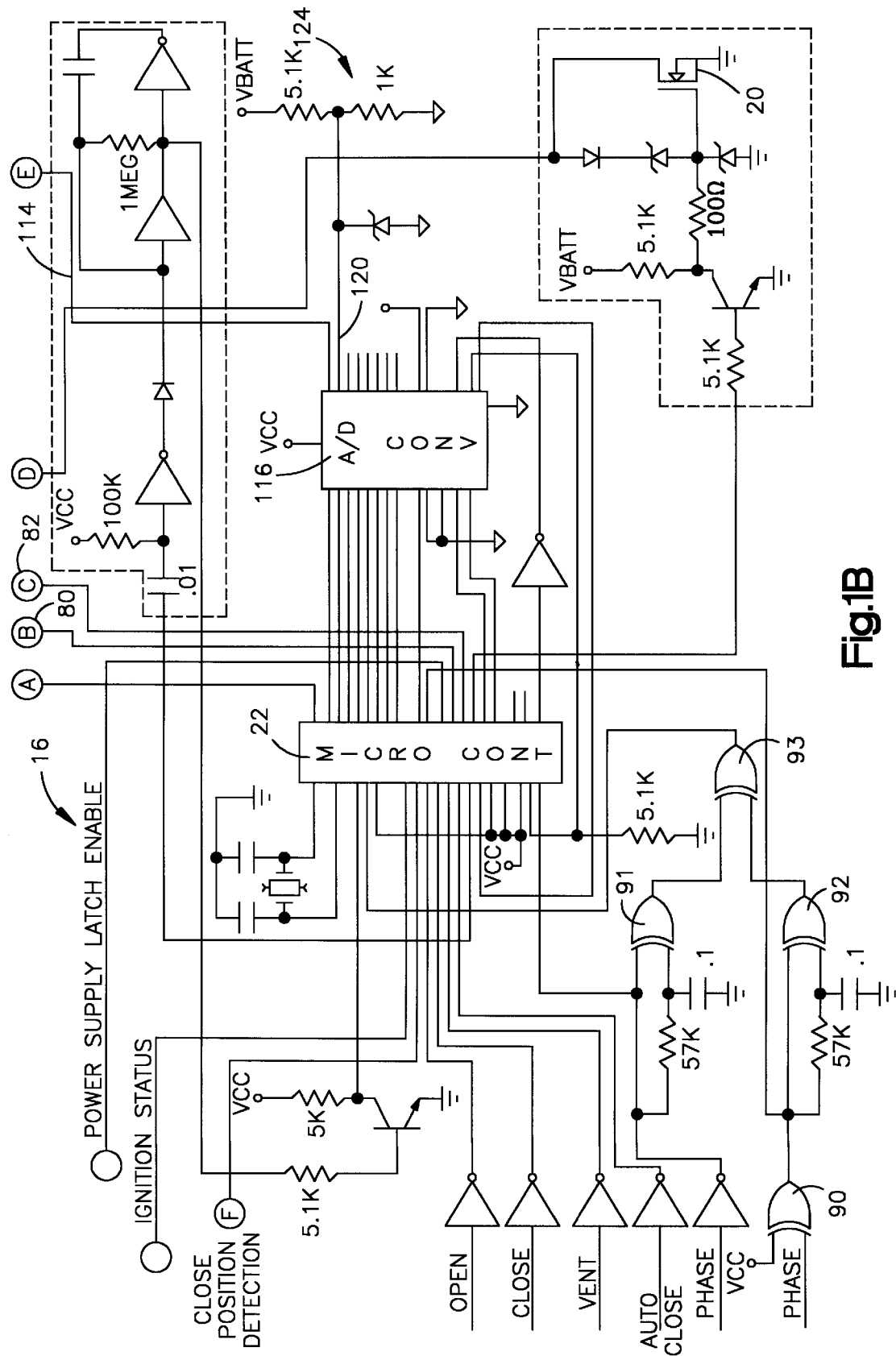
Figure 1C:
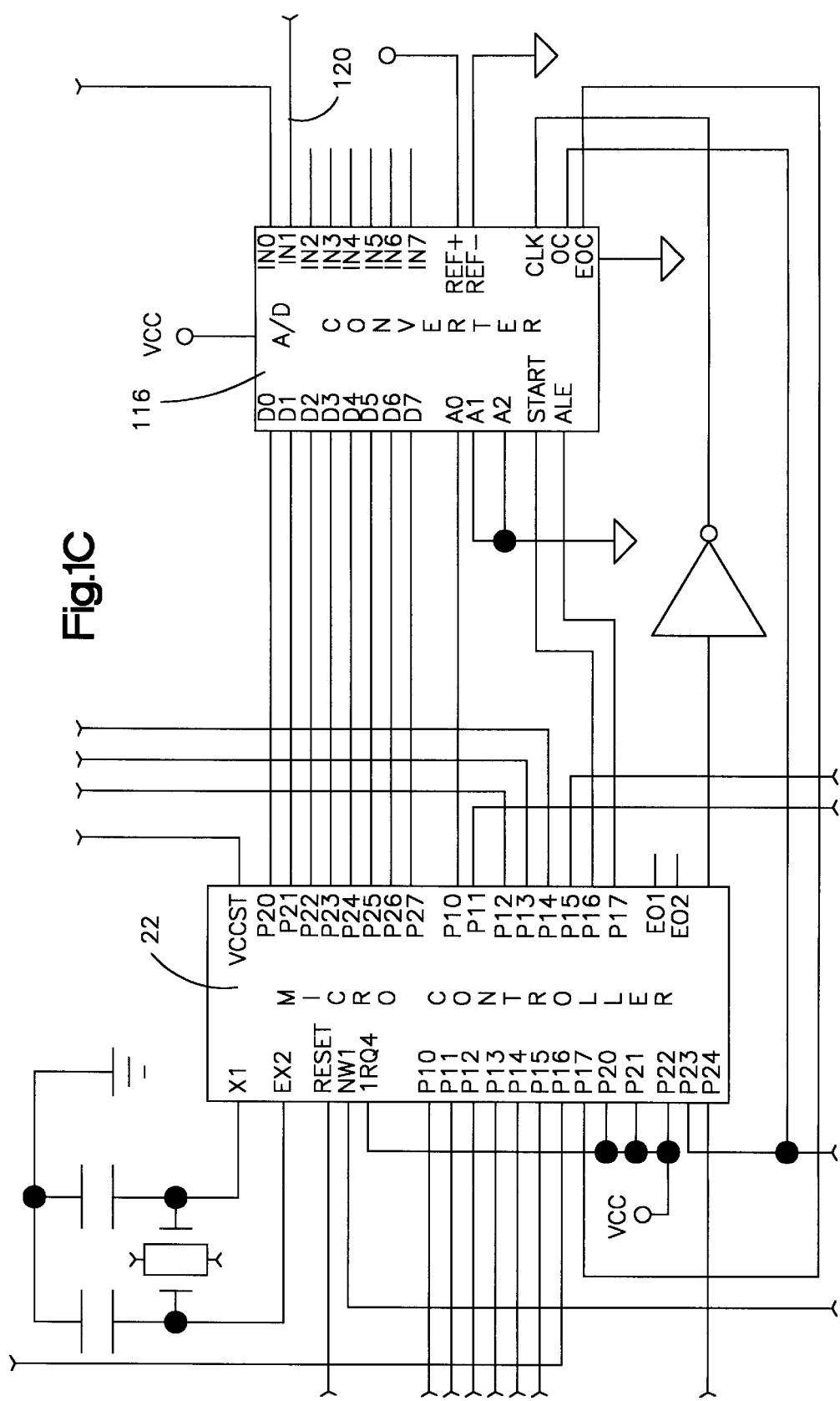
Figure 2:
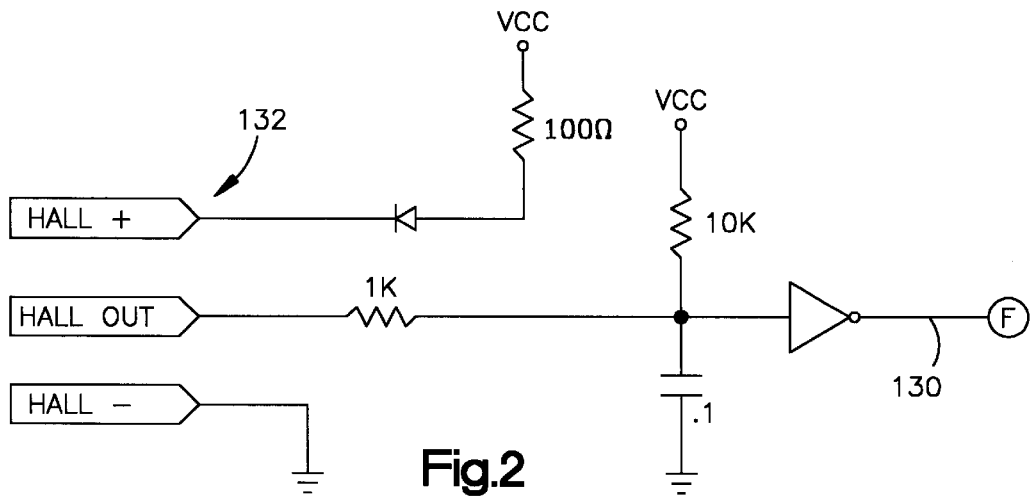
FIG. 2 is a schematic of a position sensor circuit that utilizes a Hall Effect device to sense when a sunroof panel is in a park position.

Turning now to the drawings, FIGS. 1A and 1B depict a circuit 10 for activating a d.c. motor 12 having an output shaft coupled to a transmission that moves a window or panel in a motor vehicle. A pulse width modulation activation of the motor windings controls the speed of motor output shaft rotation as the motor opens or closes the window or panel. When used to operate a power sunroof the control circuit 10 can open the sunroof, close the sunroof, and also tilt open the sunroof to a vent position. The preferred embodiment of the invention concerns a power operated sunroof but other panels or windows could be actuated using the disclosed control circuit 10.

While this disclosure deals primarily with control of operation of powered windows and panels in automotive applications, this invention has utility in controlling operation of other powered automotive components, such as doors, power seats and the like. The invention also has application in other, non-automotive technology wherever movable components are used in a way in which they could undesirably encounter obstacles or obstructions. Such applications include powered movable doors, such as in elevators and garages and industrial and retail commercial settings. Other applications include household appliances, such as washing machines, dryers and the like. Still other applications include various kinds of lifts, and motor-powered industrial machinery which drive one or more components which can undesirably encounter obstacles or obstructions, such as machine tools, conveyor systems, etc.

In addition to merely de-actuating the motor powering the driven element, it is often desirable to provide for release procedures in response to the driven element encountering an obstacle or obstruction. Such a release procedure can, for example, comprise circuitry and apparatus for causing the motor driving the element to not only stop, but actually reverse operation, in response to the driven element encountering the obstacle or obstruction.

Motor energization is accomplished by controlled actuation of a solid state device (semiconductor) Field Effect Transistor (FET) 20 (FIG. 1B) which could also be a transistor, triac, or SCR whose conductive state is controlled by a microprocessor controller 22. Although a microprocessor controller 22 is used in the preferred embodiment of the invention, hard-wired circuitry could be used to implement the disclosed controlled motor energization.

Power is applied to the motor 12 from the motor vehicle battery. As seen in FIG. 1A a battery input 24 is coupled through a resistor 26 to one of two single pole double throw relays 30,32. When one or the other of the contacts 30a,32a of the relays 30, 32 are closed, a current path from the battery input 24 through the motor windings to ground is controlled by the conductive state of the FET 20.

Power Supply

Figure 3:
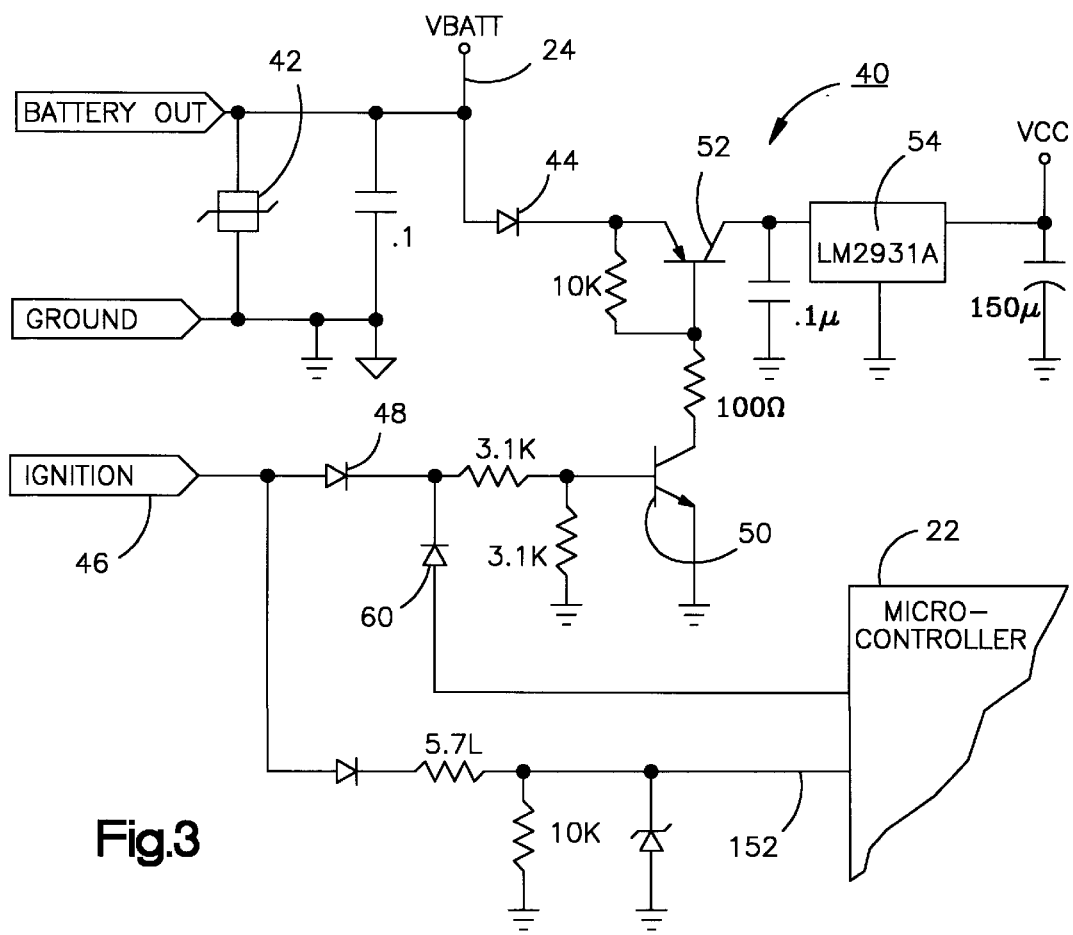
FIG. 3 is a power supply for providing regulated power to the FIGS. 1A and 1B circuit.

A power supply 40 depicted in FIG. 3 supplies a regulated voltage for powering the circuit 10. The power supply also protects the circuit 10 from external transients which could cause failure of the circuit 10. A metal oxide varistor 42 is used as a transient suppressor and a diode 44 protects the control circuit 10 from inadvertent reverse battery connection.

An ignition input 46 is used to control the condition of the power supply 40. When the ignition input goes high in response to the motorist actuation of the ignition key to either run, start, or accessory position, the high signal is transmitted through a diode 48 to a gate input of a transistor 50. This causes a second transistor 52 to conduct which applies the battery voltage to a voltage regulator 54. An output from the regulator 54 is a regulated voltage VCC for powering the circuit 10.

The power supply 40 is temporarily latched into operation for a time after the ignition signal has been removed when the user switches the ignition off. A diode 60 is connected to an output from the controller and latches the power supply 40 in the on condition. Latching of the power supply allows the circuit 10 to automatically close the power sunroof after the ignition key is turned to an off position. An advantageous feature of activating the power supply 40 and hence the circuit 10 only when the ignition is switched on is to reduce quiescent current.

External Interface

Figure 4:
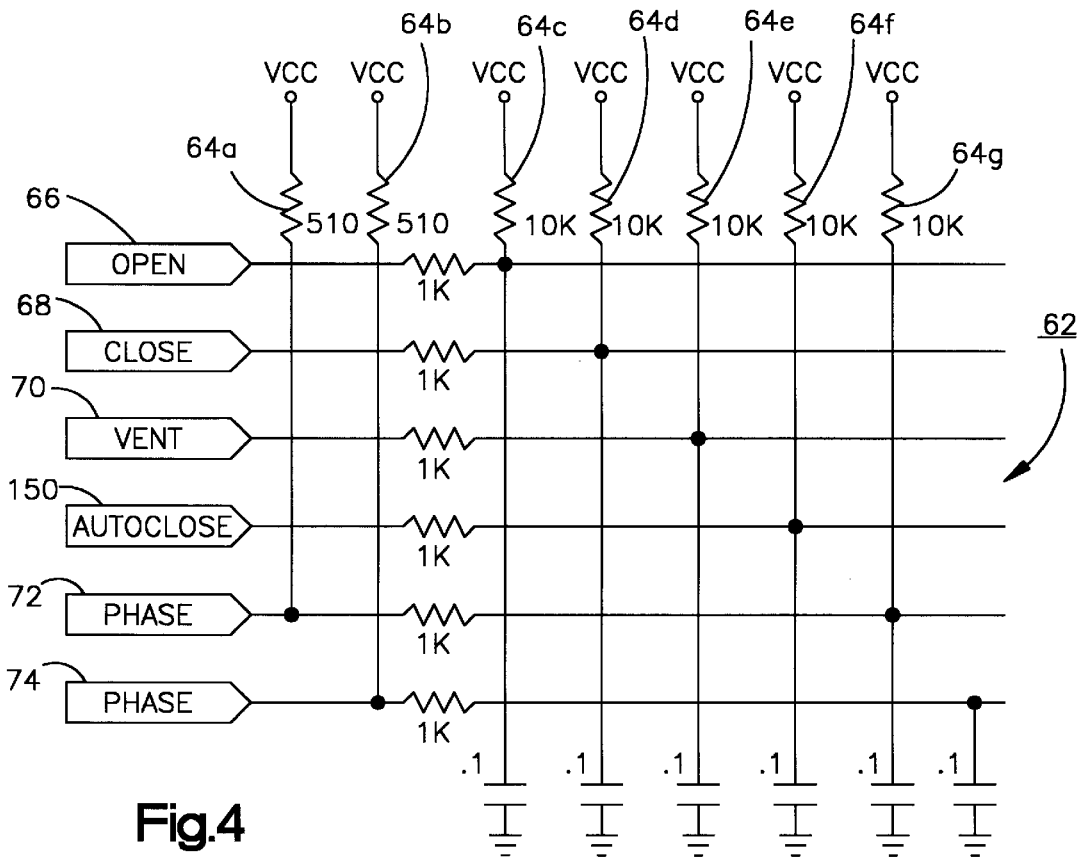
FIG. 4 is an interface for coupling inputs to a microprocessor depicted in FIG. 1B.

FIG. 4 depicts an interface 62 that couples additional signals to the circuit 10 by means of a series of pull-up resistors 64a–64g. The input designations on the left of FIG. 4 are active when they are pulled low. Corresponding labels are seen at the left of FIG. 1B. The inputs are summarized here and referred to below in describing detailed operation of the circuit 10.

An open input 66 is a momentary type input activated by the motorist and is used to open the sunroof. A close input 68 is also a momentary type input and is used to close the sunroof. A vent input 70 is a momentary type input and is used to move the sunroof to a vent position. Two phase inputs 72,74 are inputs that are connected to a position encoder. The phase inputs are toggled in a quadrature fashion and are used to provide sunroof panel speed, direction, and position feedback to the microprocessor 22.

Figure 5:
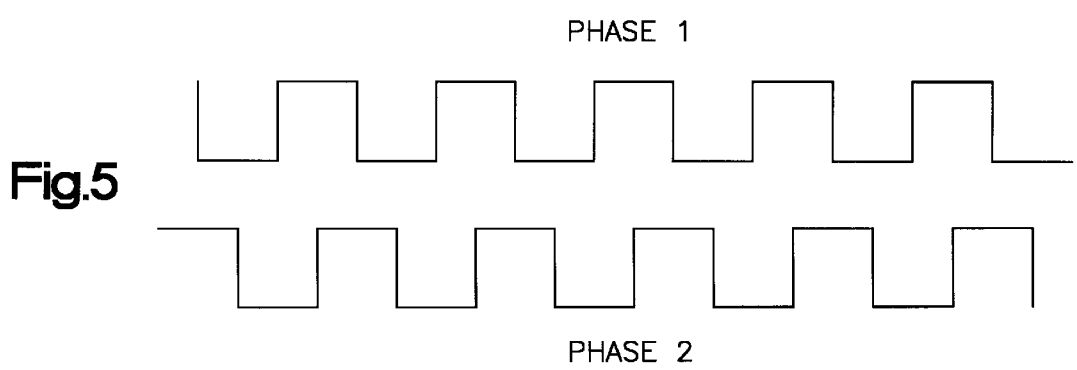
FIG. 5 is a schematic showing pulses produced by a motor shaft encoder that monitors position, speed, and direction of travel of said window or panel.

FIG. 5 depicts representative phase 1 and phase 2 signals from a motor shaft encoder, however, other position sensors such as a potentiometer or linear encoder can be used. At a given sampling time, the status of the two phase inputs is either 00, 01, 10 or 11. The transition states of these inputs allow the controller 22 to determine motor rotation direction. If the phase signals change, for example, from a 00 state to a 10 state, the motor is rotating in one sense. If the transition is from a 00 state to a 01 state, rotation is in an opposite sense. By monitoring the rate of change of the pulses, the controller 22 also determines motor speed. Finally, by counting pulses received as the sunroof moves from a park or closed position, the controller 22 can determine the position of the sunroof.

Motor Direction

In addition to controlling the pulse width modulation of the motor 12 the microprocessor controls the direction of motor actuation. Two microprocessor outputs 80,82 are used to activate Darlington switching transistors 84,86. When one transistor 84 is active an associated relay coil 30b is energized and the battery input 24 is coupled through the contact 30a to a motor terminal 12a. When the transistor 84 is not conducting, the coil 30b is not energized and the contact 30a couples the motor terminal 12a to the FET 20.

The Darling transistor 86, coil 32b and contact 32a are similarly configured to selectively connect the battery and FET connections to the motor terminal 12b. The outputs 80,82 from the microprocessor 22 can also be pulse width modulated to decrease motor drive torque as well as regulate the motor speed. When both coils 30a,30b are energized the motor windings are shorted to produce a braking effect.

A position encoder 84 produces the phase 1 and phase 2 signals for monitoring the speed, direction of movement and position of the sunroof. As seen in FIG. 1B the two phase inputs are coupled to four exclusive OR gates 90–93. These gates provide an interrupt signal to the controller 22 during a change of status of either of the two input phases 72,74. Two gates 91,92 are configured as one-shots which provide a pulse on both the leading and falling edges of their respective inputs. The output from these two one-shots are "ORED" together by the gate 93 and coupled to a non-maskable interrupt of the microprocessor.

Control Operation

The following summarizes the different functions the controller provides in actuating the motor 12. So-called manual mode is achieved by the motorist actuating either an open, close, or vent key (not shown) for at least a predetermined interval to pull one of the three inputs 66,68,70 low (FIG. 4). When in manual mode the microprocessor 22 provides 100% power to the motor 12 to move the sunroof in a direction that is requested, unless the sunroof is found to already be in the selected position. The controller 22 removes power to the motor 12 to prevent damage once the sunroof has reached its requested destination.

In a so-called express mode of operation, the motorist may depress any one of the open, close, or vent keys for less than a preset time period. This causes the sunroof to begin moving until either the roof has reached its destination, an obstruction is encountered, or the user presses another key to interrupt the express mode selection. If the motorist chooses to stop the movement during the express mode, he or she presses any one of the open, close, or vent keys.

As battery voltage increases, the amount of power provided to the drive motor 12 also increases. If 100% power is applied to the motor, the motor speed will also increase, causing the window or panel to move at a faster rate. As the speed of the window or panel increases, the obstruction detection process (discussed below) of the controller 22 has less time to detect an obstruction and to stop the motor.

To maintain a motor speed which is slow enough to allow the controller to detect and respond to an obstruction, battery voltage is monitored by the controller 22. The controller responds to changes in battery voltage and adjusts the amount of power applied to the motor 12. This is accomplished by varying the pulse width or duty cycle of motor energization via the FET 20 activation signal.

In the vent position the controller 22 can be activated to "nudge" the sunroof into a series of stepped positions which provides more precise roof positioning. When in the manual mode this nudging feature is active once the roof has reached the vent area. The vent will open to a first nudge position and stop. If the vent key is held longer than a timeout period the roof will nudge to the next level. This continues until the vent cycle is stopped manually by the user or a full vent position is reached. The nudge feature is only enabled while the roof is traveling toward the vent position. When moving the roof toward a park position, the manual mode functions normally.

Current Sense

As the motor 12 is activated by switching on and off the field effect transistor 20, current through the motor winding is sensed. A resistor 26 develops a voltage drop due to the current passing through the motor windings and this voltage is coupled to an operational amplifier 110 having an output which amplifies the voltage drop across the resistor 26. The operational amplifier 110 is configured as a differential amplifier.

The motor current signal output from the amplifier 110 contains undesired armature noise which is filtered from the output. This filtering is accomplished by an amplifier 112 which is configured as a second order low-pass filter. An output 114 from the filter amplifier 112 is coupled to an analog to digital convertor 116. The signal at the output 114 is converted to an 8-bit digital signal and coupled to the controller 22.

The pulse width modulation applied to the FET 20 is at a frequency of greater than one kilohertz. This is greater than the armature current noise and allows the motor current signal to be transmitted through the low-pass filter.

In addition to monitoring motor current, the controller 22 monitors battery voltage. An input 120 to the analog to digital convertor 116 is converted to an 8-bit signal and transmitted to the controller. The signal at the input 120 is derived from a voltage divider 124 coupled to the battery voltage VBATT and is used in determining pulse width modulation activation for the FET 20 as a function of battery voltage.

Calibration

To allow the controller 22 to perform the above functions it must first be calibrated. The calibration step need only be performed the first time power is applied to the circuit 10, subsequent to a power failure, or if the physical characteristics of the sunroof change. If calibration has not been performed an auto closure and express features are inhibited.

The motorist initiates a calibration sequence by pressing both the open and close keys simultaneously before actuating the ignition. The user must keep both keys depressed through the entire calibration process. When in the calibration mode the controller will learn all information it needs for a particular sunroof to which it is connected.

A first step of the calibration sequence is to move the sunroof panel from a park or closed position to the full vent position. The controller 22 knows when the sunroof panel is in the closed position by monitoring an output 130 from a Hall Effect sensor 132. A Hall Effect output goes low when the sunroof panel is in the parked position. This guarantees that the roof is in a known position. The controller records the physical position once the motor stalls. The sunroof panel is then moved to the full open position and this physical position is recorded. These steps allow the controller 22 to adjust its operation for various lengths of travel. The controller 22 next again returns to the full vent position and again records this position. The calibration sequence ends by returning the sunroof to the park position. During the calibration sequence, the controller 22 develops a signature or profile for the motor current as the sunroof is being closed. Use of the signature or profile to detect obstructions is discussed below.

It should be kept in mind that Hall effect sensing is but one means of detecting closure of a panel or window or other power-driven component. Many other such means exist and will be apparent to the person of ordinary skill in the art, such as limit switches, induction devices, etc.

Obstruction Detection

To detect an obstruction when the sunroof panel is closing, the controller 22 measures the battery voltage, motor current, absolute position of the sunroof, and the speed at which the roof is traveling. In order to detect an obstruction the controller must first be trained to the roof which it will be operating. Once the controller is placed into the calibrate mode it will begin to record the motor current for every inch of sunroof travel. This information is placed into a table in controller memory which is referred to as a template or a profile. When the obstruction detection process is active, motor current is measured every two milliseconds and compared against the template value.

The comparison has a window threshold which is plus or minus 37.5% of the template value. If the sensed current falls within the window, the value is interpreted to be normal and is then used to update the template value. The new template value is calculated to be twice the old value plus the current reading all divided by three. In equation form:

$$NewValue=[2(OldValue)+CurrentReading]/3$$

This is a weighted average where new reading contributes one third of the total new value. This method of checking to see if the current reading falls within a window is only used to check for a soft obstruction and is chosen due to the response time of the process versus the speed of the sunroof.

Adapting the template values to existing conditions can avoid undesired shutdowns caused by changes in temperature, mechanical wear, or sunroof mounting. By updating the template, the controller changes its own obstruction sensing characteristics with time.

To detect a hard obstruction a different control process is used that has a faster response time. This process also reads the motor current every two milliseconds. The data is stored into a first in, first out (FIFO) buffer which is twenty values deep. This allows the controller 22 to look back in time 40 milliseconds in order to detect a rapid change in motor current. A maximum slope of sensed motor current is defined to detect an obstruction based on a percentage of the template value. In the equation below, the Template Value is the motor current reading at the then current position sensed during the calibration sequence and the FIFO Value is the sensed current at a time 40 milliseconds earlier.

$$CompareValue=0.187(TemplateValue)+FIFOValue$$

If the current value of sensed current is greater than the compare value, an obstruction flag is set and the motor is de-energized. One problem that the controller addresses is the fact that the sunroof could be traveling at such a rate of speed that would not allow the controller to reverse the direction fast enough to meet the 22-pound force standard.

The roof speed is regulated based upon battery voltage. This is a primary function of the pulse width modulation output from the controller. By varying the duty cycle of the modulation applied to the gate of the FET 20 the speed of the motor is controlled as a function of sensed battery voltage. The greater the battery voltage, the smaller is the duty cycle that is needed to achieve a particular speed.

Motor Start-Up

If the sunroof is resting against an obstruction and then activated the normal obstruction techniques described previously will not work since the sensed motor current does not reach its template value instantaneously. When the controller 22 first energizes the motor 12 it supplies a 100% duty cycle pulse of power to the sunroof drive motor 12 for a short duration of 50 milliseconds. This time is chosen because it is short enough that the force on an object in contact with the sunroof will not reach 22 pounds in this interval. At the end of this short duration the motor current is sensed. If the motor current is greater than the normal start current measured during calibration then an obstruction has been detected. This procedure works even if the roof has a preloaded force on it.

After the first 50 milliseconds the controller pulse width modulates the motor from a low power level to a desired speed by ramping linearly up to the desired speed over a time interval of 450 milliseconds. By continuously varying the motor torque during start-up, the controller 22 detects an obstruction using the rate of speed of the motor.

Auto closure of the sunroof panel is achieved whenever an auto closure input 150 is grounded by the motorist and the ignition input 46 is removed. Ignition signal presence is sensed by an input 152 to the controller 22. If the auto closure input 150 is left ungrounded when the ignition is removed, the sunroof panel will remain in its present position. A fifteen second delay allows the user to close the sunroof after the ignition signal has been removed from the controller input 152. During this time the user can actuate the close input key to close the sunroof without having to return the key to the ignition. If the ignition key is switched again during the fifteen second timeout the controller returns to its normal operation. If the ignition signal is removed during an operation the controller will continue and complete the operation before stopping.

The preferred controller is a 6801 microprocessor having a 2-kilobyte read only memory operating system. Appendices A–G are subroutines from this operating system showing various aspects of controller operation.

Appendix A is a routine for accessing the contents of the A/D convertor 116.

Appendix B is a routine to keep track of the absolute position of the window or panel each time the encoder interrupt is received.

Appendix C is a routine for testing motor current each time the motor is initially actuated.

Appendix D is a routine for testing for a so-called "soft" obstruction.

Appendix E is a routine for testing for a "hard" obstruction.

Appendix F is a routine that updates the profile of current v. position.

Appendix G is a routine for stopping the motor when an obstruction is sensed.

It is to be understood that derivation of speed sensing and position sensing are not limited to being obtained from host outputs only. Well known forms of analog position and speed sensing can be used as well.

The following is a more general discussion of the theory and practice of utilizing adaptive templates or profiles for obstruction detection.

In an application where a motor is moving an object such as a panel (in linear motion) or a shaft (in rotary motion), the motor load can be expected to vary with the speed of motion. It can also vary with the relative position, rotation or amount of elapsed time from the start of the motion. For instance, a power window might be expected to have some variation in load as a function of window position. A washing machine motor in the spin dry mode could be expected to have some variation of load with respect to rotary speed of the washer's tub. Furthermore, these variations in load could be expected to be repeatable from cycle to cycle to some degree. With an electric motor, the mechanical load is highly correlated with the current draw of the motor. The harder a motor works, the more current it draws. As a result, the load variation could be measured in terms of current vs. position, speed or even time profiles. For instance, in the case of a washer in spin dry mode, the motor current (mechanical load) could be expected to start at a comparatively high value and then decrease with time and/or increased rotation speed. In an automotive powered window, the current could be expected to vary with window speed and position. In such devices, the current vs. position, speed and/or time profiles could be expected to vary slowly from one cycle of motion to the next. Over time, if bearings wear, or lubricants fail or contaminants enter the systems, the current profiles could be expected to change. However, cycle-to-cycle variations would be smaller than the long-term changes, e.g., the difference between cycle 50 and 51 would be smaller than that between 50 and 1050. Motor load could also be affected by temperature and orientation. A sliding door on a van would be harder to close in the uphill direction if the van were parked on an incline than if it were parked on a level surface. Increases or decreases in temperature from nominal values could be expected to induce expansions or contractions and change the fit between moving parts, thereby affecting motor loading. A typical current profile at one temperature could be systematically different from that at another temperature.

In practice, a current profile would be taken as a series of N current samples $I_j$ at discrete positions, time or speeds $Y_j$. As the system in question is repeatedly cycled, the profiles would be denoted $I_{j,1}, I_{j,2}, I_{j,3}$, etc., . . . for the $j^{th}$ sample of the first, second and third current profiles, respectively. In general, the $I_{j,n}{}^{th}$ current value (corresponding to profile position $Y_j$ for the $n^{th}$ cycle of operation) could be predicted to a certain degree by a function of the current values $I_{k,n-m}$ of the previous cycles (i.e., $0<m<n$ and $1 \leq k \leq N$) and the previous current values $I_{j-i,n}$ ($0<i<j$) of the $n^{th}$ cycle. In a practical device, the complexity of the predictive function (process) used would depend on the computing power available, the type of dependence between the $I_{j,n}$ and the desired degree of accuracy in the prediction. During operation, if a predictive process was employed, the predicted value $P_{j,n}$ or the $j^{th}$ current sample of the $n^{th}$ profile could be compared to $I_{j,n}$, the measured one. If the difference $E_{j,n}=I_{j,n}-P_{j,n}$ between the two values were within the nominal accuracy of the predictive process ($A_j$), the system would be considered to be in normal operation. If $E_{j,n}$ exceeded the nominal accuracy limit ($E_{j,n} > A_j$), the presence of an obstruction or jam could be suspected. Typically, the accuracy limit $A_j$ would be three or more standard deviations of the $E_{j,n}$ distribution. For instance, if the $A_j$ were four standard deviations and there were 30 samples in the current profile, the probability of a false obstruction detection would be given by:

$$30 \times 0.000063/2 = 0.00095 \text{ (assuming Gaussian statistics)}$$

which is roughly 0.1%. This would result in one false obstruction detection cycle out of every thousand cycles of operation. By using a 5- or 6-sigma accuracy limit, the fraction of false obstruction detection cycles would be even less.

The predictive process for the $P_{j,n}$ could be as simple as stored values of $P_{j,n}$ from a calibration cycle of the device in question. In such a case, the $P_{j,n}$ would simply be a fixed stored template $I_j$. The values of the $A_j$ would be selected to differentiate between normal cycle-to-cycle fluctuations and load changes caused by obstructions. The computational load would include the memory associated with storing the N value of $P_j$ (for an N value profile) and N values of $A_j$. It would also include the calculations required to determine the $E_{j,n}$ and compare them to the $A_j$. However, a limitation of a fixed template is that it becomes invalid if wear and time result in device changes that yield average values for the $I_{j,n}$ that differ from the stored $P_j$ by a significant fraction of the $A_j$. In such cases, the fraction of cycles resulting in false obstruction detections can rise to unacceptable levels. Additionally, if wear results in lower closure forces, the presence of a soft obstruction can simply bring the $I_{j,n}$ back into range of the preset and fixed $P_j$. The obstruction would then go undetected until or only if significant loads are developed (i.e., force is applied to the obstruction).

A higher order predictive process that bases its predictions on previous closure characteristics can eliminate this problem by adapting to changes in device characteristics. A simple process that accomplishes this is a low-order recursive filter such as the following:

$$P_{j,n} = (a^* P_{j,n-1} + I_{j,n-1})/(a+1) \quad \text{Eq.1}$$

This process results in $P_{j,n}$ being an approximate weighted average of the past values of $P_{j,n}$ and $I_{j,n}$ over all previous cycles. Additionally, the highest weights are given to the most recent cycles. In such an process, the larger the value of a, the longer and slower the averaging effect. An advantage of the process is that only the last set of $P_{j,n}$ have to be stored to predict the next. The memory requirements are then N values of $P_{j,n}$ and N values of $A_j$. The computation involves one multiplication, one division and one addition for each of the N positions in an N value profile. In a preferred embodiment, the value of "a" was set to "2" and $A_j$ was computed as $0.375^* P_{j,n}$ which resulted in the need to store only N values as opposed to 2N values. Setting "a" to "2" resulted in the $P_{j,n}$ being fairly close to the average over the last six cycles for each profile position. This allowed a fairly rapid adaptation which would be most appropriate for devices such as an automotive sunroof that is used only intermittently. Cycles resulting in an obstruction were not used to update the prediction for the $P_{j,n}$. This prevented the high-current values from an obstruction event from being included in the "averaging" that would determine the predictions for the next cycle. For a device used continuously, such as an automatic door, a larger value of "a" giving a slower adaptation could be appropriate. Similarly, the $A_j$ could be determined from a recursive filter as follows:

$$A_{j,n} = 4^* \{[(a^*(A_{j,n-1}/4)^2 + E_{j,n-1}^2)]/(a+1)\}^{1/2} \quad \text{Eq.2}$$

This would give a new updated set of $A_{j,n}$ for each cycle that would be approximately equal to four times the standard deviation of the $E_{j,n}$ over the last $3^*a$ cycles. With such a system, there would have to be absolute upper limits $B_j$ on the values of $A_{j,n}$. This would prevent an adaptation that would result in values for $A_{j,n}$ so large that an obstruction could not be safely detected. With a recursive process such as Eq. 1, a calibration sequence would be used to set or reset the values for $P_{j,m}$ to $I_{j,n-1}$, where cycle n-1 is the calibration cycle. This would allow the adaptation to be recalibrated after a long period of device inactivity during which operational characteristics may have changed. This would also allow a means for the recursive process to be given a reasonable starting point for the first few cycles of use. Similarly, when a recursive process such as Eq. 2 is applied to determine the $A_{j,n}$ the initial calibration values would be set to the safe upper limits $B_j$ and then would adapt to approach the desired four standard deviation values.

A higher order recursive process would require more intermediate values to be stored. For instance, $$P_{j,n} = a^* I_{j,n} + b^* P_{j,n-1} + c^* P_{j,n-2}$$

would require the last two sets of values of $P_{j,n}$ to be stored to predict the next set. An even higher order predictive filter would be given by:

$$P_{j,n} = a_0^* I_{j,n} + \text{Summation}_i[a_i^* P_{j,n-i}] \quad \text{Eq. 3}$$

where $1 \leq i \leq M$ and M<n. In such cases, it may even be desirable to apply adaptive processes to the $a_i$ that could rapidly account for changes in operational characteristics due to changes in temperature or device attitude. For instance, if closure forces are generally 10% higher at 100° F. than at 70° F., the $a_i$ could be modified as follows:

$$c_i = a_i^*[1 + (T-70)^* 0.1/30] \quad \text{Eq. 4}$$

where T is temperature in degrees Fahrenheit and '$c_i$ is the new temperature corrected filter coefficient. In a current vs. linear position profile, the effect of temperature could be different at each position resulting in the following:

$$c_{j,i} = a_i^*[1 + (T-70)^* b_j] \quad \text{Eq. 5}$$

where the $b_j$ are unique to each position. The revised filter process would then be:

$$P_{j,n} = c_{j,0}^* I_{j,n} + \text{Summation}_i[c_{j,i}^* P_{j,n-i}] \quad \text{Eq. 3b}$$

In some cases, an even more complicated adaptation may be required to continuously adapt the $a_i$ to rapidly changing systems. Such changes may include load profile changes such as might be encountered in a conveyor belt system where load varies with time of day, throughput, temperature and other factors. A host of adaptive filtering techniques such as the "stochastic gradient method" exist in Digital Signal Processing and Controls literature. These processes allow the predictive filter coefficients $a_i$ to be continuously changed in response to system characteristics. There are other classes of filter as well. Recursive filters such as Eq. 1–Eq. 3 given above are also known as "auto-regressive filters". There are also moving average and auto-regressive moving average filter types.

A moving average filter in this application would have the following form:

$$P_{j,n} = \text{Summation}_i[a_{j,i}^* I_{j,n-i}] \quad \text{Eq. 6}$$

where $0 \leq i < M$ and $M < n$, which is simply a true weighted average over the measured values of the previous M cycles as opposed to a weighted average over previous predicted values as in Eq. 3. In this case, a position dependence has been assumed in the filter coefficients resulting in M coefficients $a_{j,i}$ for each profile position j. A disadvantage of this filter is that the computation of the $P_{j,n}$ requires more storage of past values (as many as M*N values of past $I_{j,n}$) than in recursive filters such as Eq. 1. For instance, Eq. 1 with "a" set to "3" would give a fair approximation of an average over the last 9 values whereas Eq. 6 with all $a_{j,i}$ set to "⅑" and M set to "9" would give an exact average. However, Eq. 1 would require storage of only N values whereas Eq. 6 would require storage of 9N values. Additionally, Eq. 6 would require more computational steps than would Eq. 1. The relative effect of these two averaging processes (Eqs. 1 and 6) is seen in FIG. I where "a" has been set to "3" in Eq. 1 and "M" is set to "9" with all $a_{j,1}$ set to "⅑" in Eq. 6. In this graph, fraction of adaptation is shown as a function of the number of cycles over which the profile is changing. The "dotted" trace shows the response of Eq. 1 with "a" set to "3", is very close to that of Eq. 6 for 16 or more cycles. This basically shows that any change in load profile gradually taking place over or in effect for 16 or more cycles, will be adapted to by at least 60% by either of these processes. Any change gradually taking place over or in effect for 50 or more cycles will be adapted too by at least 90%. Changes taking place over a few cycles or more will only be partially followed. For instance, a gradual increase in motor current at the $j^{th}$ position will be almost completely reflected in the prediction if it occurs over 40 or more cycles. If it takes place over only five cycles, it will not be completely incorporated into the $P_{j,n}$ for as many as 10 cycles after the change. This is shown in the next two figures. In FIG. II, we have a gradual increase in motor current from a value of three to five. The increase is spread out over 40 consecutive cycles after which it remains at five. This is represented by the solid trace. The "dotted" and "dashed" traces represent the predicted current values produced by processes Eqs. 6 and 1, respectively. As can be seen, the predicted currents lag the actual current by about 10% during the change and then match the actual current with in five cycles after the end of the change. The difference between the actual and predicted currents is much greater in FIG. III where the current increases from three to five over five cycles. In this case, we see predicted current lagging the actual current by 40% or more, initially. After the current rise, a full 10 cycles is required for predicted current to match the actual current. In cases where a more rapid adaptation is required, it is possible to use more and/or appropriately selected process coefficients to produce a more rapid adaptation to accommodate faster changes. Fourier transforms of processes Eq. 1 and 6 show that they are a crude type of "Low Pass filter". This is seen in FIG. IV where the "dotted" and "solid" traces show the amplitude vs. frequency characteristic of Eq. 1 with "a" set to "3" and Eq. 6 with "M=9&$a_{j,i}$=⅑", respectively. The sampling frequency is 200 Hz. As can be seen, the response falls rapidly with increasing frequency. An process with a more rapid adaptation would have its coefficients selected to produce a larger amplitude at high frequencies than is seen in FIG. IV. Techniques for the determination of such coefficients abound in the literature and can be found in Digital Filters by R. W. Hamming among other sources.

FIGS. V and VI compare the fraction of adaptation and Fourier Transforms of Eq. 6 where first:

M=9 and the $a_{j,i}$ are set to ⅑ and second:

M=9 and the $a_{j,i}$ are selected for a larger response at higher frequencies.

As can be seen in FIG. V, selecting the $a_{j,i}$ for a faster response (dotted) results in a strong adaptation within six cycles as opposed to the 16 cycles required for simple averaging over nine cycles (solid). FIG. VI shows that the modified $a_{j,i}$ result in a strong response out past 25 Hz. (dotted) as opposed to the low response seen beyond 16 Hz. for nine-cycle averaging (solid). The "overshoot" to a response of 1.2 in the dotted traces is related to the "Gibbs Phenomenon" and is well discussed in the literature of Digital Filters. Numerous techniques available to those skilled in the art (digital filtering) exist to control this overshoot. FIG. VII compares the rapidly varying current of FIG. III (solid) to the predicted currents of Eq. 6 with the nine-cycle averaging (dotted) and higher frequency response (dashed), $a_{j,i}$ selections. As can be seen, the higher frequency response implementation of Eq. 6 is able to track the rapid current change much more closely than with nine-cycle averaging. However, this rapid adaptation necessarily results in a diminished sensitivity. For instance, a mechanical failure that develops over the course of a few cycles could be adapted to and missed as the predicted $P_{j,n}$ would be able to adapt and track the actual $I_{j,n}$ to a higher degree than in the nine-cycle averaging. For those skilled in the art, design choices can be made to balance the required sensitivity against the number of cycles required for an adaptation.

In some cases, there could be a correlation between the various positions "j" along a given motor load profile. In such a case, an even more general form of Eq. 6 can be applied as follows:

$$P_{j,n} = \text{Summation}_{k,i}[a_{j,k,i} * I_{k,n-i}] \qquad \text{Eq. 6a}$$

where $1 < k < N$, $0 < i < M$. In practice, some of the $a_{j,k,i}$ may be zero. For instance, in cases where a decision must be made within five consecutive samples of a given cycle, not all $I_{k,n}$ would be available and the $a_{j,k,i}$ would have to be set to zero when "i=0" and "k−j>4".

In a very general form of an auto-regressive moving average filter, the predictive process would appear as follows:

$$P_{j,n} = \text{Summation}_{k,i}[a_{j,k,i} * I_{k,n-i}] + \text{Summation}_{p,q}[b_{j,p,q} * P_{p,n-q}] \qquad \text{Eq. 7}$$

where $1 \leq k \leq N$, $1 \leq p \leq N$, $0 \leq i \leq M$ and $0 \leq q \leq Q$. In some cases, certain of the $a_{j,k,i}$ and $b_{j,p,q}$ may be zero. For instance, if an adjustment determination has to be made based on the most recent sample, $a_{j,k,0}$ and $b_{j,p,0}$ would have to be 0 for "j−k<0" and "j<p<1", respectively. Additionally, in many cases the correlation between positions within motor load profiles will be minimal and/or ignored. In such cases, the $a_{j,k,i}$ and $b_{j,p,q}$ will be zero for "j≠k" and "j≠p", respectively. Furthermore, any or all of the coefficients $a_{j,k,i}$ and $b_{j,p,q}$ could be adaptive through processes such as the "Stochastic Gradient Method" or even fuzzy logic processes. The coefficients could alternately or additionally have explicit temperature, acceleration, time or inclination dependencies such as in Eq. 5.

Fuzzy logic adaptive (self-training or learning) process systems are also well disclosed in the literature. For instance, in the case of an automotive powered seat, a pressure feedback could be used to infer the weight of the occupant. The weight of the occupant and/or other parameters such as vehicle inclination and acceleration would be used in a fuzzy logic process to modify the predicted profile. With such a procedure, a motor load profile that was crushing or entrapping an individual would be differentiated from the same load profile that was merely moving a heavier individual.

The scope of this invention is not in the application of a specific process, but rather the application of predictive processes in general to motor load profiles to enable detection of obstructions or other abnormalities. Use of the predictive processes can allow a close comparison of predicted motor load profiles $P_{j,n}$ to actual motor load profiles $I_{j,n}$.

Close comparison, in turn, enables the detection of small changes in motor load caused by the presence of obstructions like a child under a powered garage door. In such a case, the door can then be halted and retracted to prevent injury and/or entrapment. Similarly, sudden and unsafe changes in operating condition such as might occur with component failure can be detected in time to halt operation and prevent further damage. This has particular advantages in cases where the accuracy of the prediction is such that soft obstructions can be detected without having false detections during unobstructed cycles. Systems like garage door openers, power windows and hydraulic presses could be expected to have much repeatability from cycle to cycle and would allow close comparison between predicted and measured load profiles. Additionally, control or monitoring of actuation speed can be used to account for load profile variations at differing speeds. In a preferred embodiment, variations in load profile due to fluctuations in actuation speed were overcome by controlling the power to maintain an approximately constant or slowly varying speed vs. position profile. This, in turn, resulted in a highly repeatable motor load vs. position profile.

To facilitate close comparisons, statistically based limits on the allowable variation between predicted and measured values can be determined by applying the predictive processes to $(I_{j,n}-P_{j,n})^2$. This was done with Eq. 1 to produce Eq. 2. Measures of variability such as those related to range or standard deviation (as in 2) can be used to distinguish between the normal statistical variations inherent in any physical system and those due to obstruction or system failure. However, prior safety considerations such as the maximum allowable force that can be applied to an obstruction (as in an automotive sunroof application) may force absolute limits to exist that will override statistically determined limits. In such cases, the designer will have to make trade-offs between the degree of safety and the allowable rate of false obstruction detections. In cases where the allowable limits fall within the range of likely statistical fluctuations, a "consecutive samples out of range" requirement can be used. For instance, a safe limit $(A_{j,n})$ on the allowable difference between measured and predicted values $(E_{j,n}=I_{j,n}-P_{j,n})$ could be exceeded by statistical fluctuations at the 15% level. A 100-sample profile would then have a failure at one or more positions in virtually every cycle of operation. However, an obstruction or other mechanical failure could be expected to effect consecutive samples whereas statistical fluctuations would be less likely to. For random fluctuations within a given cycle, a failure requirement of two or more consecutive samples being out of range could be used. In the present example, statistical fluctuation would produce six consecutive "out of range" samples $0.15^6=0.0011\%$ of the time. A 100-sample profile would then have a false failure rate of approximately 0.11% if a "six consecutive samples out of range" requirement were used. This would result in less than two false failures out of every 1,000 cycles. With this requirement in place, small but systematic changes in load profile can be detected even when they are within the range of statistical fluctuations or system noise. Where fluctuations tend to be between cycles and effect consecutive samples within each cycle, this methodology would be less effective.

Requiring consecutive samples to exhibit a similar behavior is equivalent to requiring that they behave the same on average and/or over a long time base. As a result, a type of "consecutive samples out of range" requirement could be achieved by applying a "low pass filtering" or averaging process to the $I_{j,n}$ to produce $L_{j,n}$ which are then compared to predicted values $Z_{j,n}$. The predicted values, $Z_{j,n}$ and limits would simply be produced from the $L_{j,n}$ in the same manner (processes Eqs. 1–6) that the $P_{j,n}$ are produced from the unfiltered measured values, $I_{j,n}$. For instance, the following process:

$$L_{j,n}=[I_{j,n}+2*L_{j-1,n}]/3 \qquad \text{Eq. 8}$$

results in $L_{j,n}$ being close to the average of the $I_{j,n}$ over the previous six-sample positions within cycle "n" at each position "j". $Z_{j,n}$, in turn, would be produced from the $L_{j,n}$ using processes such as Eqs. 1 or 6. With this form of six-sample averaging, if "$L_{j,n}-Z_{j,n}$" exceeded the allowable limit, it would imply that the last five $I_{j,n}$ samples probably did, too. This would mean that testing $L_{j,n}$ for single failures would be roughly equivalent to testing $I_{j,n}$ for multiple consecutive failures. Similarly, by appropriate choice of coefficients, "low pass filtering" processes of the following form could be used to minimize the effect of system noise and statistical fluctuations:

$$L_{j,n}=a_{j,0}*I_{j,n}+\text{Summation}_i[a_{j,i}*L_{j-i,n}] \qquad \text{Eq. 9a}$$

$$L_{j,n}=\text{Summation}_i[a_{j,i}*I_{j-i,n}] \qquad \text{Eq. 9b}$$

$$L_{j,n}=\text{Summation}_k[a_{j,k}*I_{j-k,n}]+\text{Summation}_i[b_{j,i}*L_{j-i,n}] \qquad \text{Eq. 9c}$$

Equivalently, hardware low pass filters could be applied to the measured parameter(s) before the $I_{j,n}$ are measured. Note that in practice, a hardware "low pass" anti-aliasing filter with a cut-off frequency at half the sampling frequency will normally be required anyway. For those skilled in the art of digital and analog filtering, a design trade can be readily made between the cost of producing filtered $L_{j,n}$ and the cost of providing an analog filter with a cut-off frequency below that required for anti-aliasing.

Predictive processes such as Eqs. 1–7 will generally have their coefficients selected to give a "low pass filtering" or "weighted averaging" across previous cycles. In this way, information from the past and present cycles is used to predict the behavior of the next cycle. This allows detection of small changes in load profile such as would be caused by a soft obstruction, particularly when "consecutive samples out of range" requirements or "low pass" filtering across the $I_{j,n}$ in the present cycle are used. However, in some systems, a hard obstruction or catastrophic failure might be possible. In such a case, the delay associated with "consecutive samples out of range" requirements or "low pass" filtering of the $I_{j,n}$ could allow a multiple sample overtravel before an error is detected.

This overtravel could result in injury or damage when a hard obstruction or serious mechanical failure is present. In cases where the obstruction is a child, this could be a significant problem. An inch of overtravel when the child's abdomen is caught in a sliding panel might be acceptable. However, even a quarter inch of overtravel when the child's head is caught could result in serious injury.

With soft obstructions or small mechanical failures, the difference between the predicted values $P_{j,n}$ and the measured values $I_{j,n}$ can build up gradually over a number of consecutive measurements within a cycle. With a hard obstruction, the difference will build far more quickly. The problem is in differentiating the rapid build-up of a hard obstruction or failure from statistical fluctuation or noise before damage has been done. The simplest approach is to use little or no filtering on the $I_{j,n}$ and require a larger value of "$I_{j,n}-P_{j,n}$" to infer failure. Under this regime, "low pass filtering" with a comparatively small limit on the "$L_{j,n}-Z_{j,n}$" could be used to detect soft obstructions while, at the same time, unfiltered or minimally filtered $I_{j,n}$ would be used in an "$I_{j,n}-P_{j,n}$" comparison with a larger limit.

In some cases, such as in the preferred embodiment, high or band pass filtering may even be used to further identify a hard obstruction. In such a case, a hardware "high pass filter" could be employed or the coefficients of processes such as Eqs. 9a–9c would be selected for a "high pass" characteristic and applied to the $I_{j,n}$. In the preferred embodiment, a simple differencing process of the following form was used:

$$D_{j,k,n} = I_{j,n} - I_{j-k,n} \qquad \text{Eq. 10a}$$

The $D_{j,k,n}$ were then compared to an absolute limit different than that used for the "$I_{j,n}-P_{j,n}$" comparison in the soft obstacle detection. This differencing process is equivalent in form to Eq. 9b where:

$$D_{j,k,n} = \text{Summation}_i[a_{j,i} * I_{j-i,n}] \qquad \text{Eq. 10b}$$

with:

$a_{j,i} = 1$ for $i=0$ $a_{j,i} = -1$ for $i=k$ $a_{j,i} = 0$ otherwise

Figure 15:
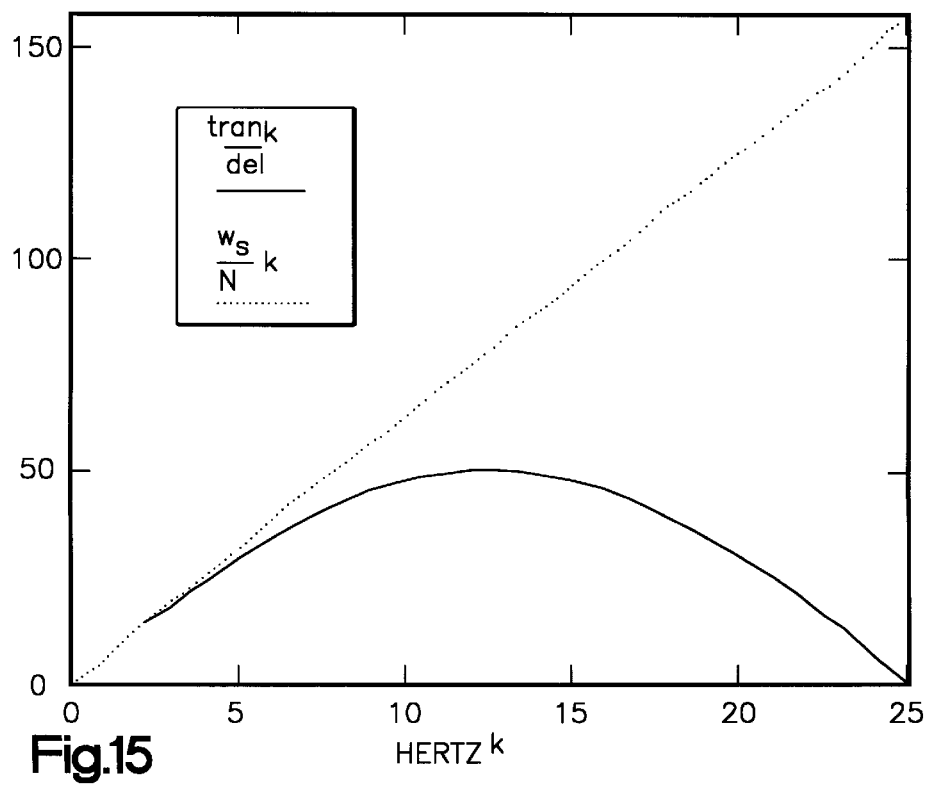
FIG. 15 is a graph of a fourier transform of a derivative algorithm (dotted) and algorithm (10) with 50 Hz sampling rated and "k=2" (solid)
Figure 16:
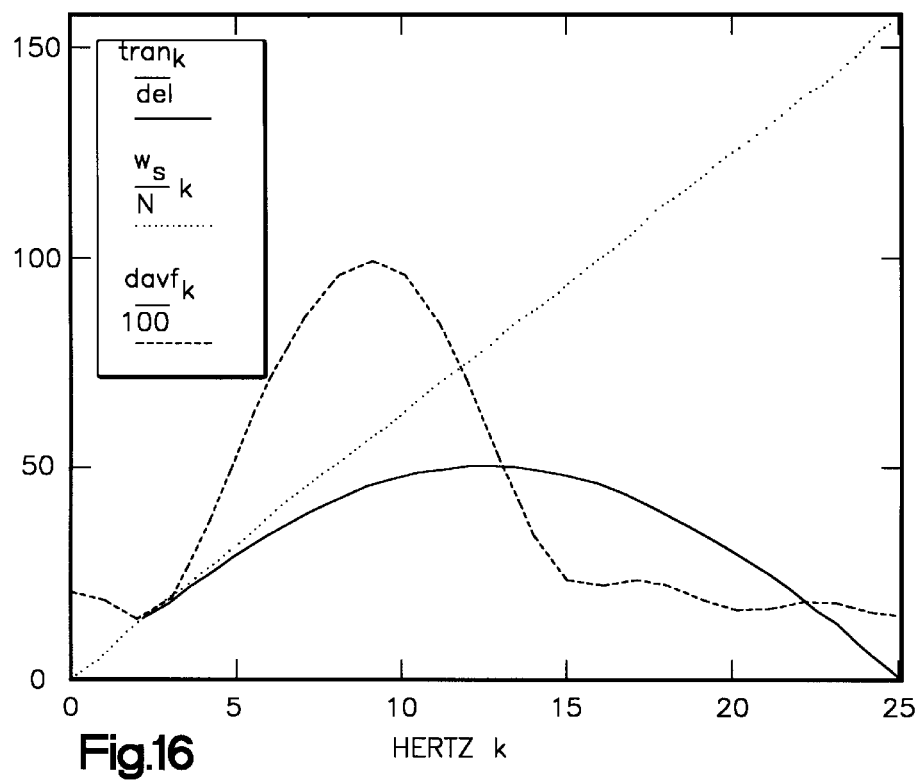
FIG. 16 is a graph of a fourier transform of a derivative algorithm (dotted), algorithm (10) with "k=2" (solid) and algorithm (6) with coefficients selected for a "bandpass characteristic (dashed) at a 50 hertz sampling rate.

A value of "k" was selected that gave an approximately 40 ms. difference between the times at which an $I_{j,n}$ and an $I_{j,k,n}$ would be measured. With this process, the $D_{j,k,n}$ become a low-order approximation to the derivative of the $I_{j,n}$. FIG. 15 shows the Fourier Transforms of a true "differentiating process" (dotted) and of Eq. 10a with "k=2" at a 50 Hz. sampling rate. As can be seen, both filters emphasize higher frequencies out to 12 Hz. at which point the Eq. 10 response begins to fall off. This contrasts to the "averaging" and "low pass" responses seen for processes Eqs. 1 and 6 with "low pass" choices for the process coefficients. In some cases, the statistical fluctuations and/or system noise may appear at a higher frequency than the hard obstruction effect. In such a case, a band pass filter amplifying the frequency range of a hard obstruction and de-emphasizing others could be appropriate. The Fourier Transform of Eq. 6 with a "bandpass characteristic" choice for the coefficients is shown in FIG. 16.1 It also should be noted that the differencing Eq. 10a also exhibits a "bandpass characteristic".

Small gradual changes in motor load profile induced by a soft obstruction would appear at low frequencies. As a result, they would be de-emphasized by processes such as Eqs. 10a or 10b (with a "bandpass characteristic") and yield small values for the $D_{j,n}$. A hard obstruction occurring at a higher and amplified frequency would yield comparatively large values for the $D_{j,n}$ which would then exceed an appropriately selected limit.

In practice, a "low pass characteristic" process would be applied to the $I_{j,n}$ across the "j" dimension to produce $L_{j,n}$. These $L_{j,n}$ would then be processed by processes such as Eqs. 1–7 to produce predicted values $Z_{j,n}$ and limits on "$L_{j,n}-Z_{j,n}$". This would provide detection of soft obstructions. To detect hard obstructions, a process with a higher frequency response such as a "band pass", "high pass" or higher cut-off frequency "low pass" would be applied to the $I_{j,n}$ to produce $D_{j,n}$. These $D_{j,n}$ would then be processed by processes such as Eqs. 1–7 to produce predicted values $V_{j,n}$ and limits on "$D_{j,n}-V_{j,n}$". This would provide for detection of hard obstructions. Note that in many cases, an appropriate choice of the width and location of the "pass band" characteristic would allow either the $L_{j,n}$ or $D_{j,n}$ to be used for both hard and soft obstruction detection. The characteristics of the soft and hard obstructions combined with the noise, statistical fluctuation, load profile characteristics and processing power of the system under control, will determine which combination of $I_{j,n}$, $L_{j,n}$ and/or $D_{j,n}$ will be used.

As in the case of the $I_{j,n}-P_{j,n}$ and the $L_{j,n}-Z_{j,n}$, predictive processes such as those in Eqs. 1 and 6 can be applied to the $(D_{j,n}-V_{j,n})^2$ to produce limits on $D_{j,n-Vj,n}$ that are related to the variability between filtered load profiles $D_{j,n}$.

Figure 17:
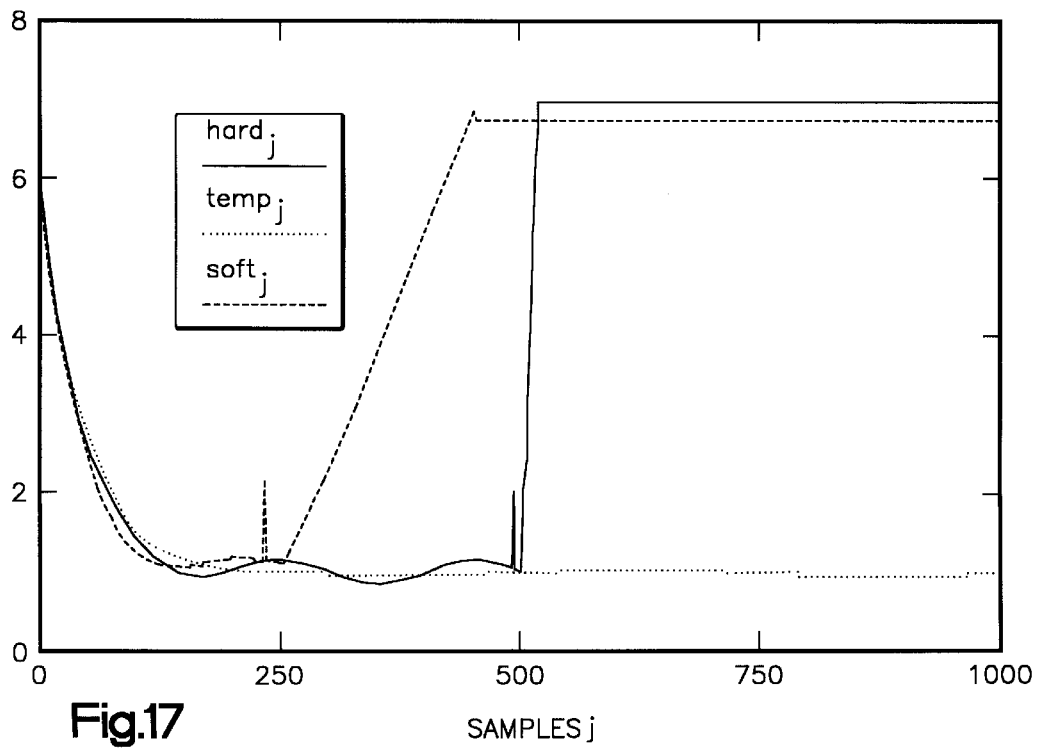
FIG. 17 is a graph of predicted load profile (dotted), load profile with a soft obstruction (dashed) and profile with hard obstruction (solid)

FIG. 17 shows simulated motor current vs. time profiles for no obstruction (dotted), a soft obstruction at the $250^{th}$ sample position (dashed) and a hard obstruction at the $500^{th}$ sample position (solid). The soft obstruction rises from the nominal current to a stall current over the course of 200 samples. The hard obstruction rises to the stall value over the course of 15 samples. Additionally, noise pulses for hard and soft obstruction profiles have been added at the $492^{nd}$ and $232^{nd}$ positions, respectively.

Figure 18A:
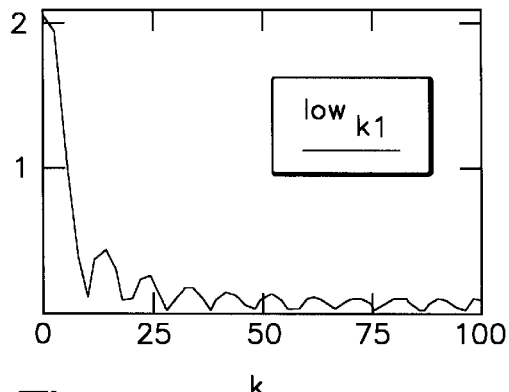
FIG. 18 is a graph of lowpass and bandpass filter characteristics used to produce the $L_{j,n}$ and $D_{j,n}$, respectively.
Figure 18B:
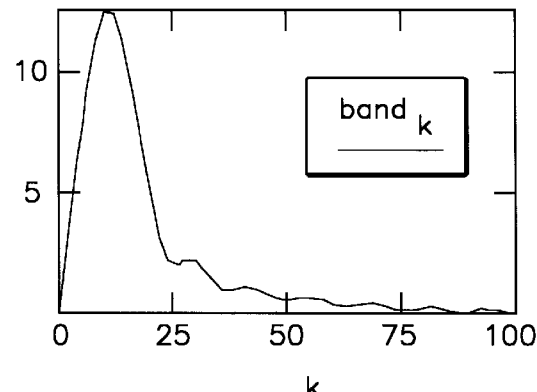
Figure 19:
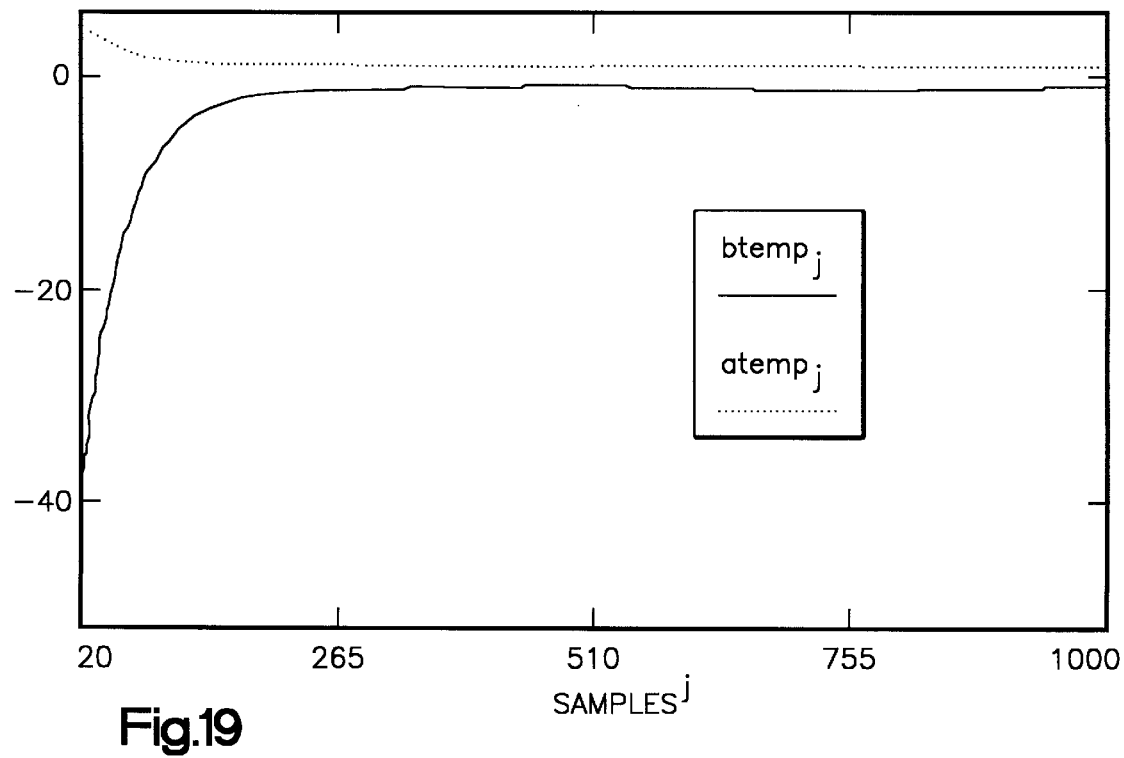
FIG. 19 is a graph of preducted profile $Z_{j,n}$ (dotted) for the $L_{j,n}$ and predicted profile $V_{j,n}$ (solid) for the $D_{j,n}$.
Figure 20:
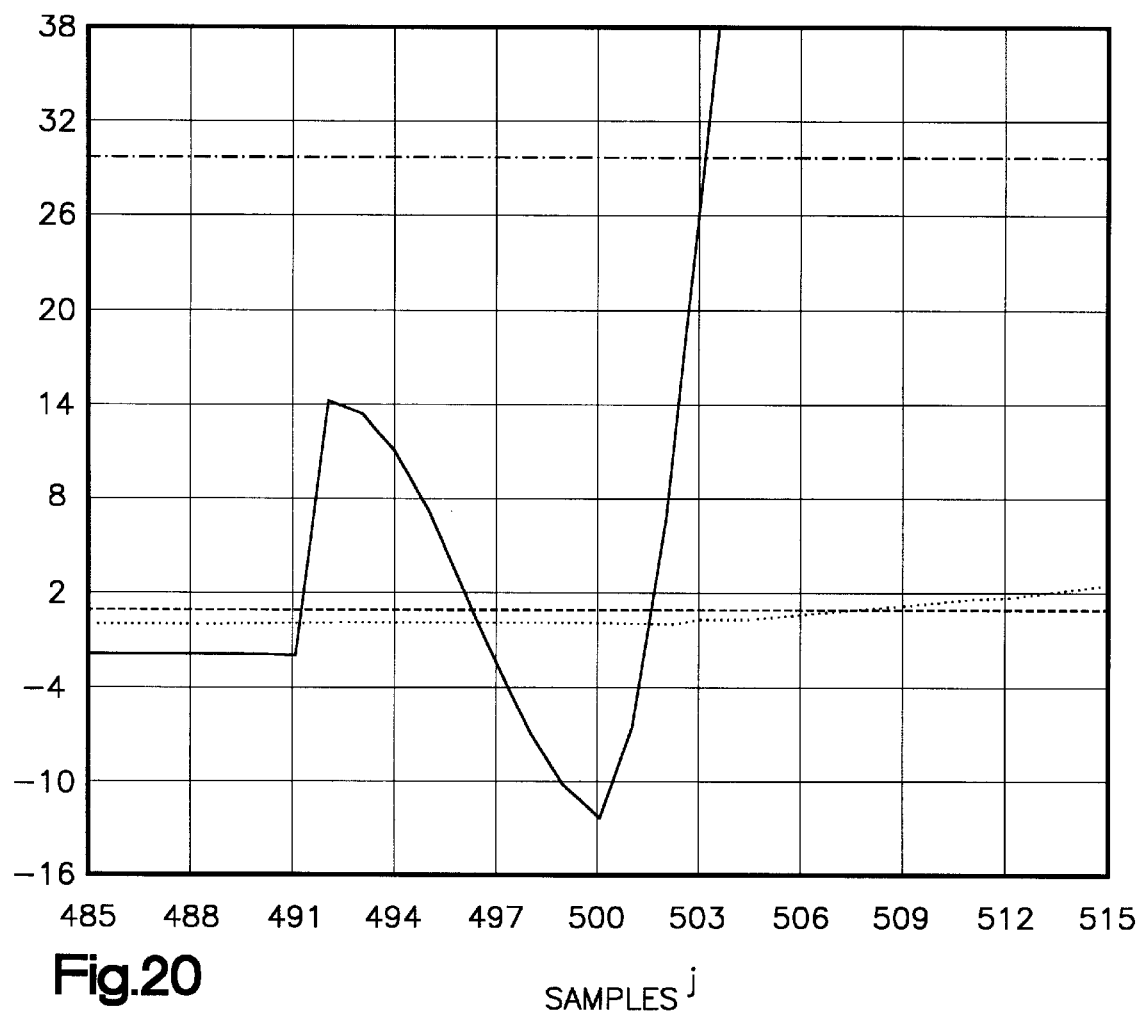
FIG. 20 is a graph of $L_{j,n}$–$Z_{j,n}$ (dotted), limit for $Z_{j,n}$ (dashed), $D_{j,n}$–$V_{j,n}$ (solid), and the Limit for $D_{j,n}$–$V_{j,n}$ (dash-dotted) for a hard obstruction case.
Figure 21:
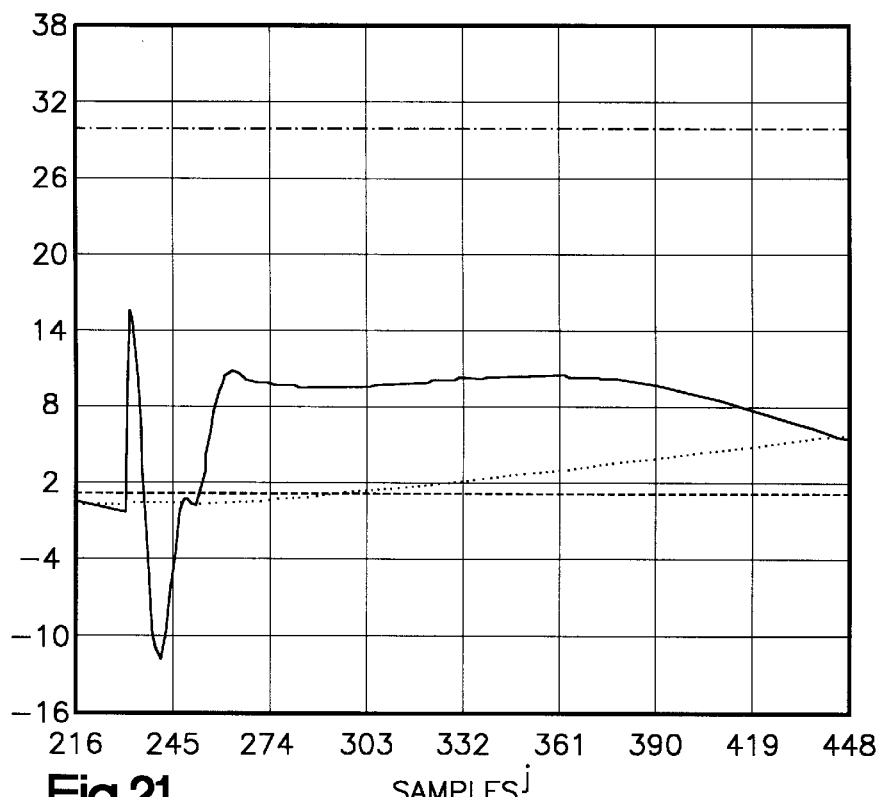
FIG. 21 is a graph showing $L_{j,n}$–$Z_{j,n}$ (dotted), limit for $L_{j,n}$–$Z_{j,n}$ (dashed), $D_{j,n}$–$V_{j,n}$ (solid), and the limit for $D_{j,n}$–$V_{j,n}$ (dash-dotted) for the soft obstruction case.
Figure 22:
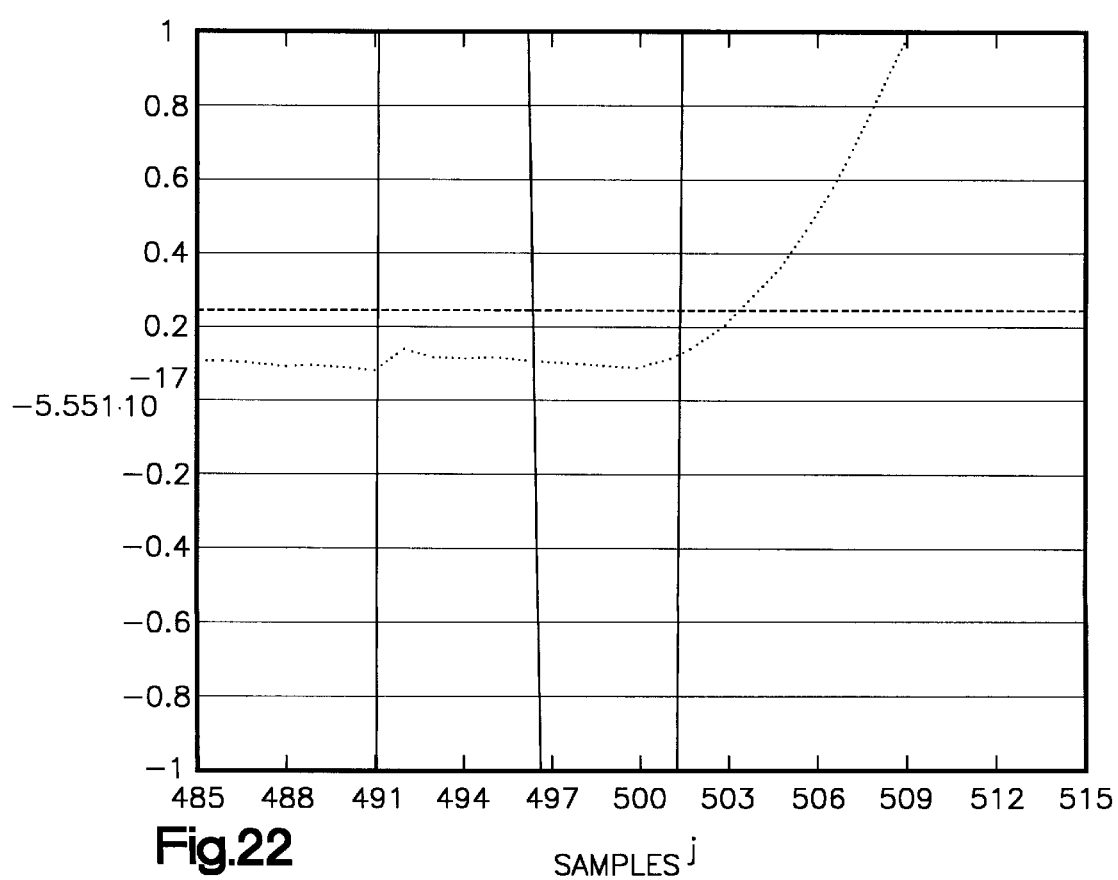
FIG. 22 is a graph of $L_{j,n}$–$Z_{j,n}$ (dotted), limit for $L_{j,n}$–$Z_{j,n}$ (dashed), $D_{j,n}$–$V_{j,n}$ (solid) for the hard obstruction case.

A simple stall current detector would allow full force to be applied before intervention could be made. Ideally, a controller would detect both the soft and hard obstructions before significant force has been applied. FIG. 18 shows response vs. frequency characteristics for processes to produce appropriate $L_{j,n}$ and $D_{j,n}$, respectively from measured $I_{j,n}$ for these current load profiles. FIG. XII shows the $Z_{j,n}$ and $V_{j,n}$ that would be obtained from the $L_{j,n}$ and $D_{j,n}$ with processes such as Eqs. 1 and 6 when no obstructions are present. "$D_{j,n}-V_{j,n}$" (solid) and "$L_{j,n}-Z_{j,n}$" (dotted) are shown for the "hard obstruction" current profile in FIG. 20. An appropriate limit for the "$D_{j,n}-V_{j,n}$" is "30" which is shown as the dashed-dotted line. An appropriate limit for the "$L_{j,n}-Z_{j,n}$" is "1" which is shown as the dashed line. As can be seen, "$D_{j,n}-V_{j,n}$" exceeds the limit of "30" at the $503^{rd}$ position, ⅕ of the way through the "hard obstruction" current rise. "$L_{j,n}-Z_{j,n}$", on the other hand, does not exceed its limit of "1" until the $509^{th}$ position, roughly ½ of the way through the "hard obstruction" current rise. In this case, the "$D_{j,n}-V_{j,n}$" provides the quickest response. Note that the noise pulse at the $492^{nd}$ position is present in the "$D_{j,n}-V_{j,n}$" but remains well below the limit of "30". In FIG. 21, the results are shown for the "soft obstruction" profile. In this case, the "$D_{j,n}-V_{j,n}$" values will never exceed their limit of "30" and result in no obstruction detection. However, the "$L_{j,n}-Z_{j,n}$" values exceed their limit of "1" by the $290^{th}$ position which is approximately 40 samples into the 200-sample current rise for the soft obstruction. In this case, the "$L_{j,n}-Z_{j,n}$" test is clearly superior. The "hard obstruction" profile is shown again in FIG. XV. Here we see that a limit of "0.25" for the "$L_{j,n}-Z_{j,n}$" would allow detection of the "hard obstruction" by the $504^{th}$ sample. The noise value of "1" at sample 492 in the $I_{j,n}$ is clearly suppressed below the 0.25 level. However, noise or fluctuations at the >0.25 level that were spread out over many samples in a given cycle, would not be suppressed and could result in a false trigger. On the other hand, the same kind of noise distribution would have little effect on the "$D_{j,n}-V_{j,n}$" as they would be well below the detection threshold of "30" and could even be suppressed if a "band" or "high pass" characteristic were used in the process producing the $D_{j,n}$. Conversely, if rapid fluctuations and noise within given cycles were sufficiently low, the detection threshold for the "$D_{j,n}-V_{j,n}$" could be lowered to "4" where it would have allowed detection of the "soft obstruction" in FIG. XIV.

In summary, $L_{j,n}$ ("low pass" filtered in "j" dimension $I_{j,n}$) are used to detect "soft obstructions". They can also be used to detect "hard obstructions" if noise and fluctuations are not systematic across given cycles. On the other hand, $D_{j,n}$ ("high" or "bandpass" filtered in "j" dimension $I_{j,n}$) are useful for detecting "hard obstructions". If (high frequency in the "j" dimension) system noise and fluctuations are not excessive, they can also be used for detecting "soft obstructions". For designers skilled in the art of digital and analog signal processing, the choice of predictor comparison(s) $L_{j,n}-Z_{j,n}$, "$D_{j,n}-V_{j,n}$" and/or $I_{j,n}-P_{j,n}$ will be dictated by the noise and fluctuation characteristics as well as the computation capabilities of the system to which they are applied.

Examples of the need for the two detection modes are seen in sunroof controllers. If a child's neck were entrapped during closure, the added load on a motor would come on gradually as the child's neck would give initially on contact. The increase in motor load would build up gradually over several profile positions until the required number of successive values of the $I_{j,n}$ (or a single value of L) exceeded the predicted $I_{j,n}$ by more than the allowable $A_{j,n}$. For profile positions separated by 0.005", this could result in an obstruction detection within one or two tenths of an inch after contact with the child's neck. Upon detection, the controller would stop and retract the sunroof before injury could occur. In this scenario, the yielding nature of the child's neck might never have caused a large enough $D_{j,n}$ to have signaled an obstruction detection by a high or bandpass filtered comparison. However, if the child's head had been trapped, the initial contact would have created a rapid change in motor load within a few profile positions. At that point, the differential comparison would signal an obstruction and the controller would stop and reverse the sunroof. Without the high or bandpass filtered comparison, the delayed response of the or $L_{j,n}$ comparison would have resulted in one or two tenths of an inch of overtravel and possible injury. On the other hand, use of heavy filtering or a consecutive position out of range requirement for the $I_{j,n}$ comparisons provides insulation from false detections due to noise. At the same time, it retains the sensitivity required to detect small load changes such as those introduced by soft obstructions.

An alternative approach for having both soft and hard obstacle detection can be achieved by having a dual threshold detection in either the low or band-passed comparisons.

Another example of an applicable system for this control method would be a hydraulic press with real time actuation pressure, position and/or speed measurement. With a hydraulic power press, the profile would be pressure vs. time or position, speed vs. time or position, or position vs. time. A calibration cycle would be used to take an initial load profile for a given (or each) combination of workpiece and die. In subsequent work cycles, a human hand or a stray part interposed between the workpiece and the moving half of the press die will result in contact earlier than in the predicted load profile. The resulting load would differ from that in the predicted profile. The press could then be halted before further injury or damage could occur. Similarly, the predicted profile could be used to detect defective or aberrant materials by their effect on the measured profile. Use of such a control system would allow effective employment of a braking device to halt movement more quickly than would occur by simply cutting off drive power. In the case of a stray or misaligned part, the hard obstruction detection would be most likely to occur; with a human hand it would be the soft obstruction detection.

State-of-the-art press and molding equipment now have a means to detect obstructions via pressure or motor load monitoring. However, they have false detections from the effects of lubrication changes and component wear. The present invention overcomes this by the use of predictive processes such as the averaging filter described in the previous example. These processes allow the predicted profile to change with and adapt to the operating characteristics of the device to which it is applied.

An additional use of recursive filter processes in this application is seen where there is a high repeatability in the shape but not necessarily the magnitude of a motor load profile. An example is seen in "Linear Predictive Coding" where a given sample in a cycle "n" is predicted by the previous samples in that cycle through an application of an auto-regressive filter. Specifically, this is accomplished in an process of the following form:

$$P_{j,n}=a_0*I_n+\text{Summation}_k[a_k*P_{j-k,n}] \qquad \text{Eq. 11}$$

where $I_{j,n}$ and $P_{j,n}$ are the measured and predicted load values for the $j^{th}$ position of the $n^{th}$ cycle with $1 \geq k \geq K$. K is generally kept to as small a value as possible to limit memory and computational requirements. In some cases, ten or even fewer $a_k$ may be adequate to characterize a given motion. The literature contains many processes for the determination of the $a_k$. A common process that is used is the Levinson-Durbin process. The $a_k$ determination is made by applying an process such as the Levinson-Durbin process to a set of $I_{j,n}$ that spans one or more cycles. In an adaptive situation, a solution process would be applied repeatedly to continuously adapts the $a_k$ to changing characteristics of the system. By using a recursive process such as Eq. 11 to predict the $P_{j,n}$, the characteristics of the motion are kept in the coefficients $a_k$ as opposed to in long-term averages of consecutive values of $I_{j,n}$ or $P_{j,n}$ for each profile position "j" as in Eq. 6. An application for this approach is seen in cases where the cycle of motion does not vary, but the load does, for instance, as in the case of the start-up interval on a power seat. In this case, the weight of the passenger and attitude of the vehicle may vary. This would force the initial motor load to be higher or lower from cycle to cycle as passengers and vehicle inclinations change. However, the shape of the load profile as it starts from rest, and then accelerates to a steady rate of motion would be repeatable to a degree. The Eq. 8 would then be applied to the start-up interval for the power seat, and then would be replaced by a scaled "motor load vs. position" process such as Eq. 6 once the system had reached final speed. The "scaling" would rescale the $P_{j,n}$ of the "load vs. position" profile prediction Eq. 6 (and the limits) to match the $P_{j,n}$ of the "Linear Predictive Coding" prediction at final speed. In this manner, an obstruction during the start-up could be detected and the weight of the passenger and the vehicle inclination could be accounted for without the use of extra sensors for weight and inclination measurement.

A further application is seen in interpolation. For instance, a powered sunroof panel might have 20 or more inches of travel. A motor current vs. position profile with samples taken every few milliseconds could easily be thousands of values long. This would impose a substantial burden in terms of memory, especially in the case where that memory is non-volatile. However, if the profile is slowly changing between positions, it would not be necessary to store all consecutive $P_{j,n}$ for a given cycle. If the profile is changing slowly enough with respect to profile position, only a sampling consisting of every $M^{th}$ (such as every $10^{th}$) value would have to be stored. During the comparison stage, a temporary value of zero would be given to all intermediate (non-stored) values of $P_{j,n}$. Then, a low order low-pass filter process such as:

$$Q_{j,n}=\text{Summation}_k[a_k*I_{j-k,n}] \qquad \text{Eq. 12}$$

would be applied. The $a_k$ would be selected to give a low-pass" filter characteristic. For 1 out of 10 samplings, 9 out of every 10 $P_{j,n}$ values would be set to zero with every $10^{th}$ value being one of the stored values. With the right "low-pass" filter, the $Q_{j,n}$ end up, having interpolated values (instead of zero) between the stored values. Effectively, the low-pass filter becomes an interpolator to fill in the missing intermediate values that were not stored. The $Q_{j,n}$ then become the predictor values for the profile. This method of interpolation is common in digital signal processing literature. Alternatively, other methods of interpolation could be applied such as are found in the mathematics of "finite differences". An example of such is "LaGrange's Interpolation Formula."

In summary, predictive processes can be used to build predicted profiles from averages across multiple cycles, from values within the present cycle or from both. The characteristics of the motion being predicted can be stored in the predicted profiles as in Eqs. 1–3 or can be stored in the parameters of the process as in Eq. 11. However, once a predictive process is applied, the predicted "load profile" values are then compared to the measured ones. When there is a significant difference (beyond expected statistical fluctuations and/or system noise), the existence of an abnormality can be inferred. In a particular case of interest, the abnormality could be due to an obstruction caught in a moving part. The motion is then stopped, slowed and/or reversed to allow the obstruction to be cleared. Lowpass filtered load profile and/or bandpass filtered profiles can both be used. The lowpass filtered load profile allows detection of small long-term changes in load profile such as might be caused by a soft obstruction or minor mechanical failure. The bandpass filtered version of the load profile allows rapid detection of hard obstructions which cause abrupt changes in load profile. For a child caught in an automatic door, obstruction detection could avoid serious bodily harm. For a piece of automatic machinery, obstruction detection could prevent serious mechanical damage that might otherwise occur from an obstruction or mechanical failure.

In the preferred embodiment, the selected motor load profile is motor current vs. position. Hard obstacle detection is accomplished by a low-order bandpass filtered $I_{j,n}$ test as follows (see Eq. 10a as well):

$$D_{j,n} = I_{j,n} - I_{j-k,n}$$

$$V_{j,n} = 0$$

and the test is:

$$D_{j,n} - V_{j,n} = D_{j,n} \leq 0.187 * P_{j,n}$$

where $I_{j,n}$ and $P_{j,n}$ are the measured and predicted values of the motor current for the $j^{th}$ position of the $n^{th}$ cycle. In this test, "i" is selected so that $I_{j-i,n}$ is the measured motor current value that was taken 40 milliseconds previous to $I_{j,n}$ in the same cycle "n".

The current vs. position profile template specifically described in this disclosure is not the only type of template which could be possible and useful in detecting and responding to obstructions to movement of the controlled element. Other templates, or current profiles, which offer utility are current vs. speed and current vs. time. A current vs. time template, for example, would facilitate applications to rotating machinery in particular. Other types of templates which could be used to advantage include: current vs. speed templates; position vs. time templates; speed vs. time templates; speed vs. position templates; mechanical loading vs. position templates; mechanical loading vs. speed templates; and mechanical loading vs. time templates.

Additionally, it would be feasible to employ an accelerometer to measure instantaneous acceleration of the powered movable component, and to employ acceleration data in the control of powered component movement. In still other embodiments, temperature data would be useful in controlling movement of a powered component. Alternately, in instances in which the attitude of the powered movable component changes with time during motion, an inclinometer could be used to indicate instantaneous powered component attitude and thus be employed in control of the powered component in accordance with the present invention.

Other applications of the present invention can include rotatory appliances such as electric mixers; wheelchair lifts; sewing machines; fans of various types; automatic insertion equipment; and presses.

Where the powered element or component is of large mass, or achieves relatively high speeds during its movement, generating substantial momentum, the present control invention can be augmented by a large mechanical, or other type of brake, to stop abrupt motion of the controlled element where contact with an obstacle or obstruction is detected. This feature would be in addition to cutting off power to the motor. Implementation of apparatus for accomplishing this purpose is well within the ordinary skill in the art, for all that is needed is to use an electrically actuated brake and actuate the brake by coupling it appropriately to the source of the signal which is used to de-activate or reverse the motor in response to encounter with an obstacle. A motor current vs. time adaptive template could be used for this purpose, but it would also be possible to employ other templates to perform this function.

Figure 6:
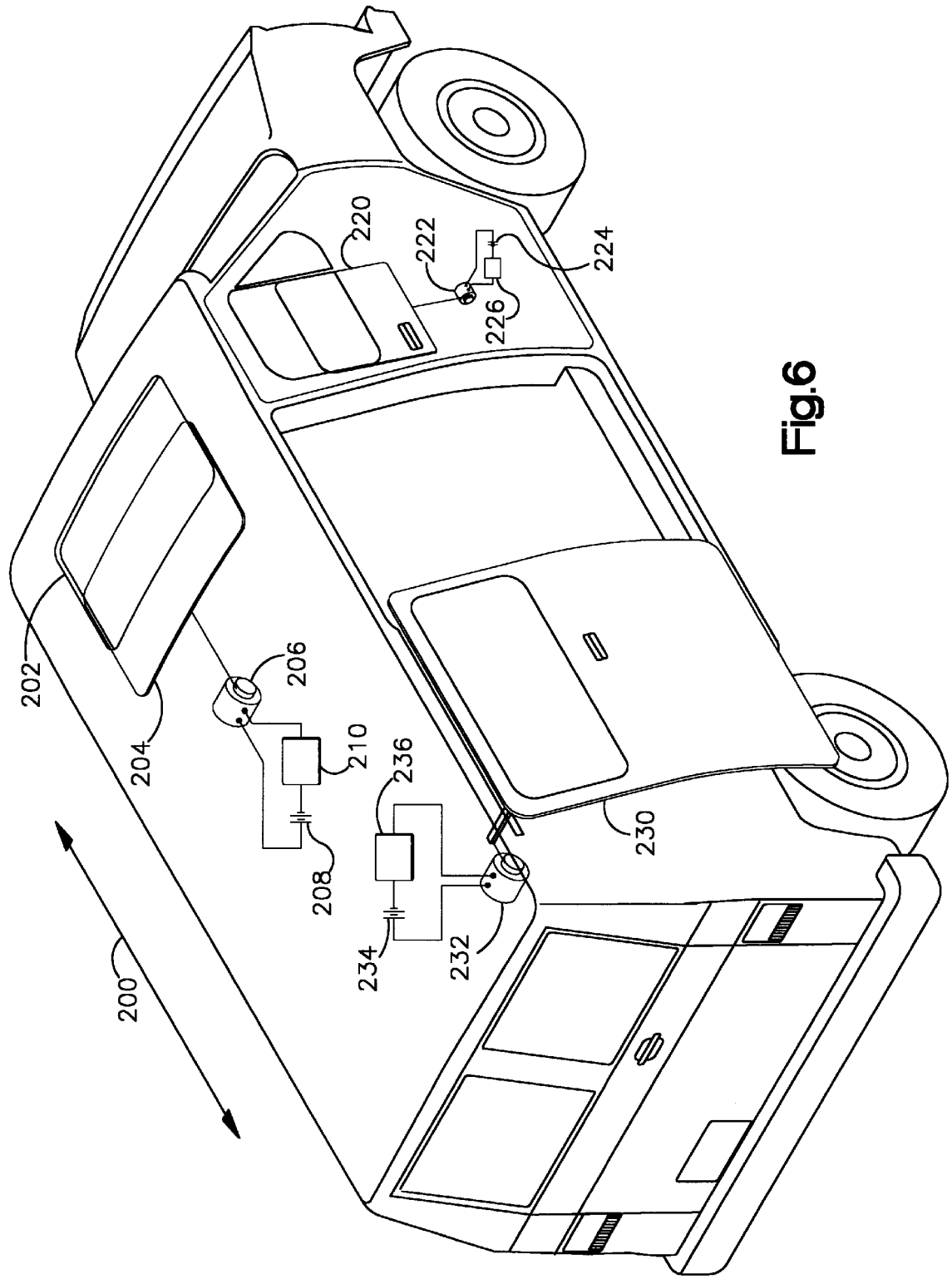
FIGS. 6 and 7 are pictorial illustrations, partially broken away, showing several applications of the present invention.
Figure 7:
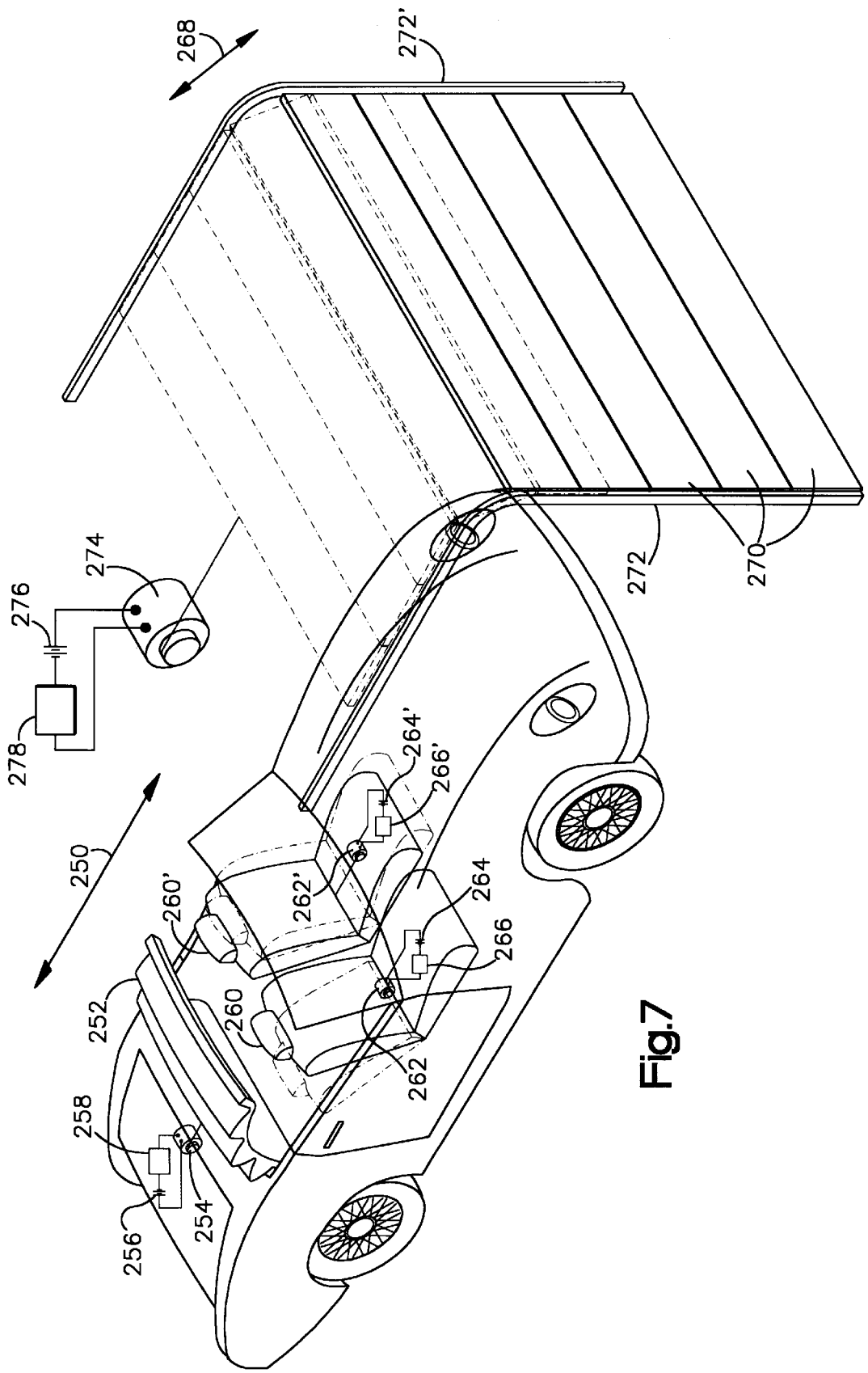
Figure 10:
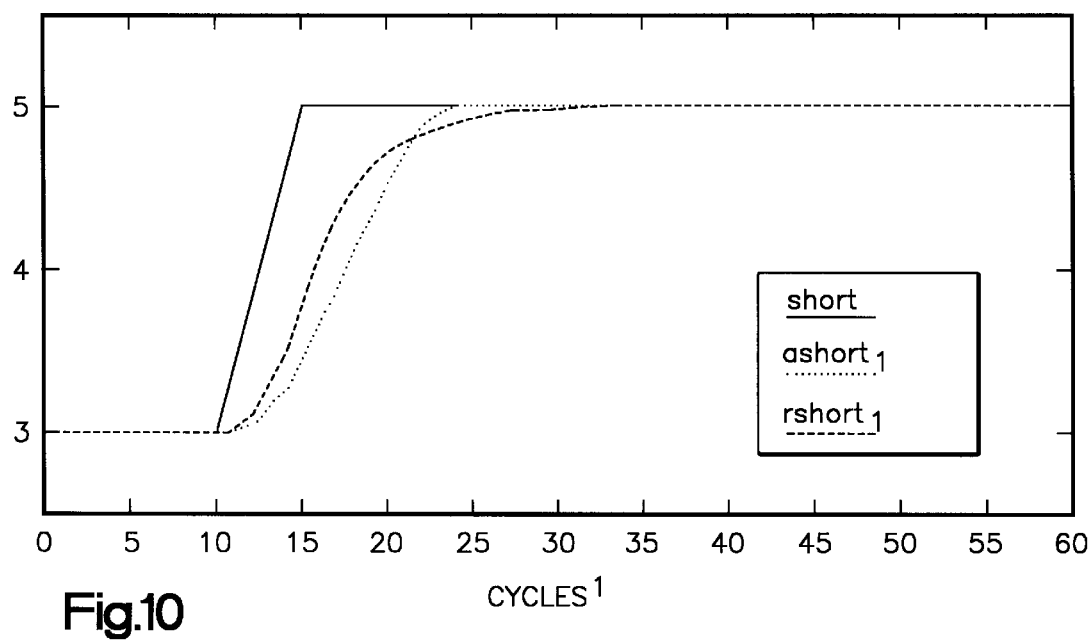
FIG. 10 is a graph of actual current (solid), algorithm (6) predicted (dashed) and algorithm (1) predicted current (dotted) for a rapidly changeing load profile.
Figure 11:
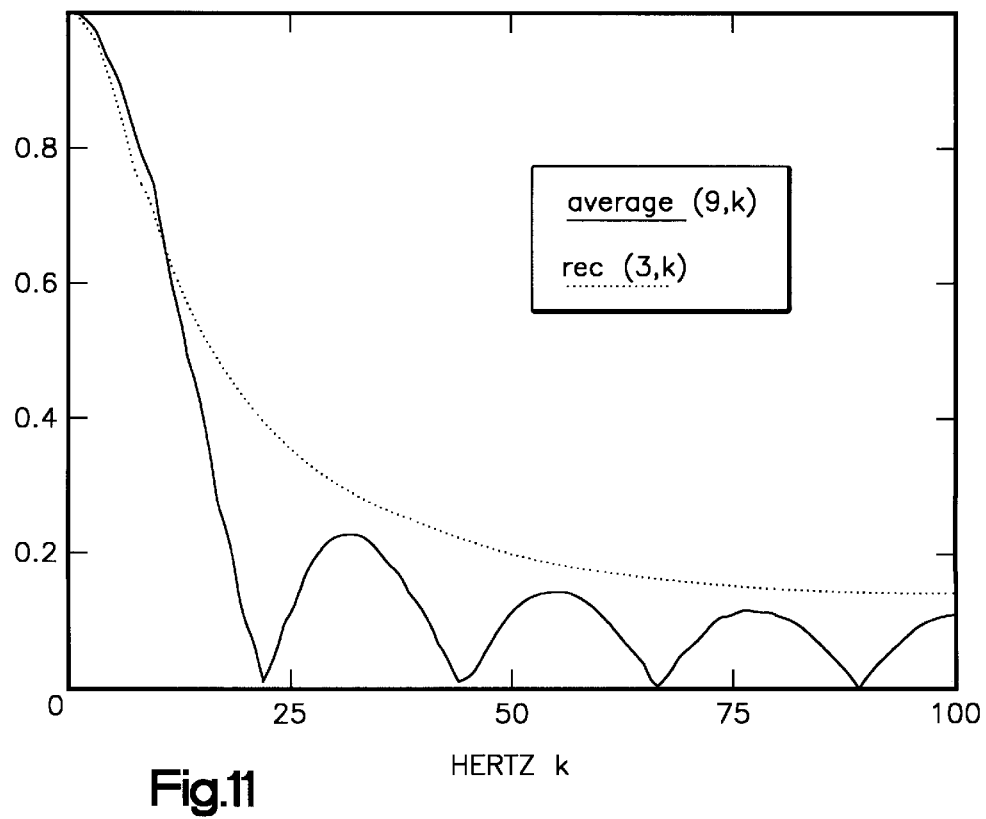
FIG. 11 is a graph of fourier transform of algorithms (1) and (6) for "a"=3 (dotted), "M"=9 and the $a_{j,i}$=⅑ (solid)
Figure 12:
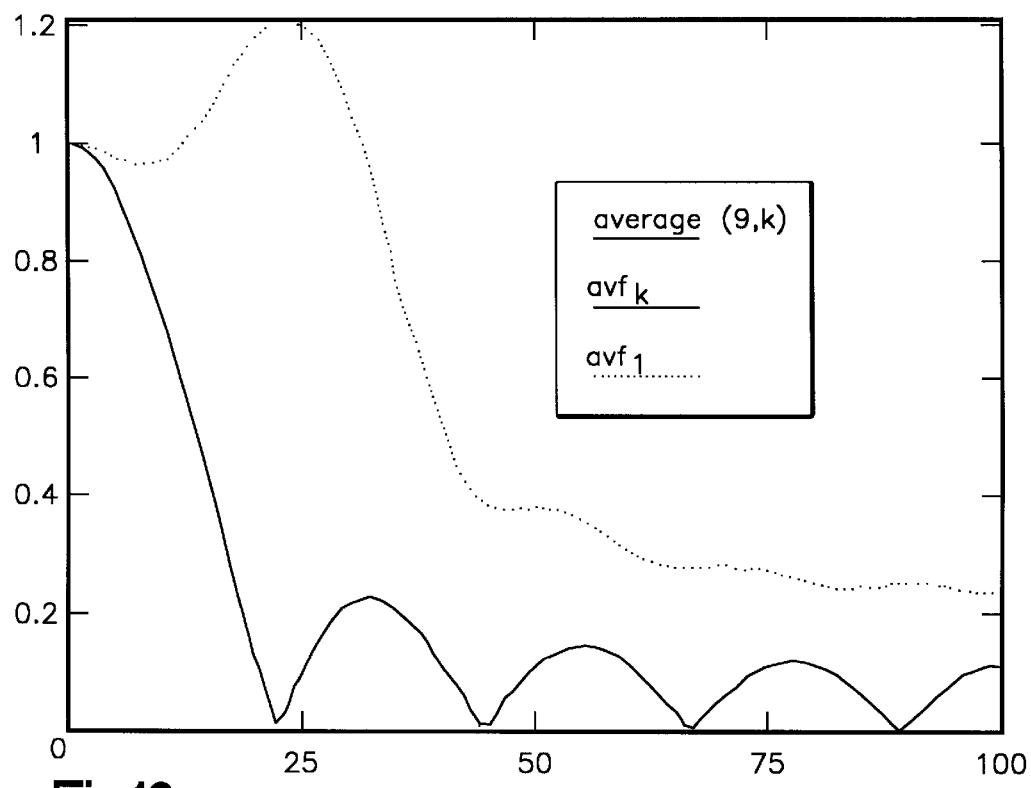
FIG. 12 is a graph of a fraction of adaptation of algorithm (6) as a function of the number of cycles with: 1) "M" set to 9 and the "$a_{j,i}$" set to ⅑ (solid) and 2) "M" set to 9 and the selected for a more rapid response (dotted)
Figure 13:
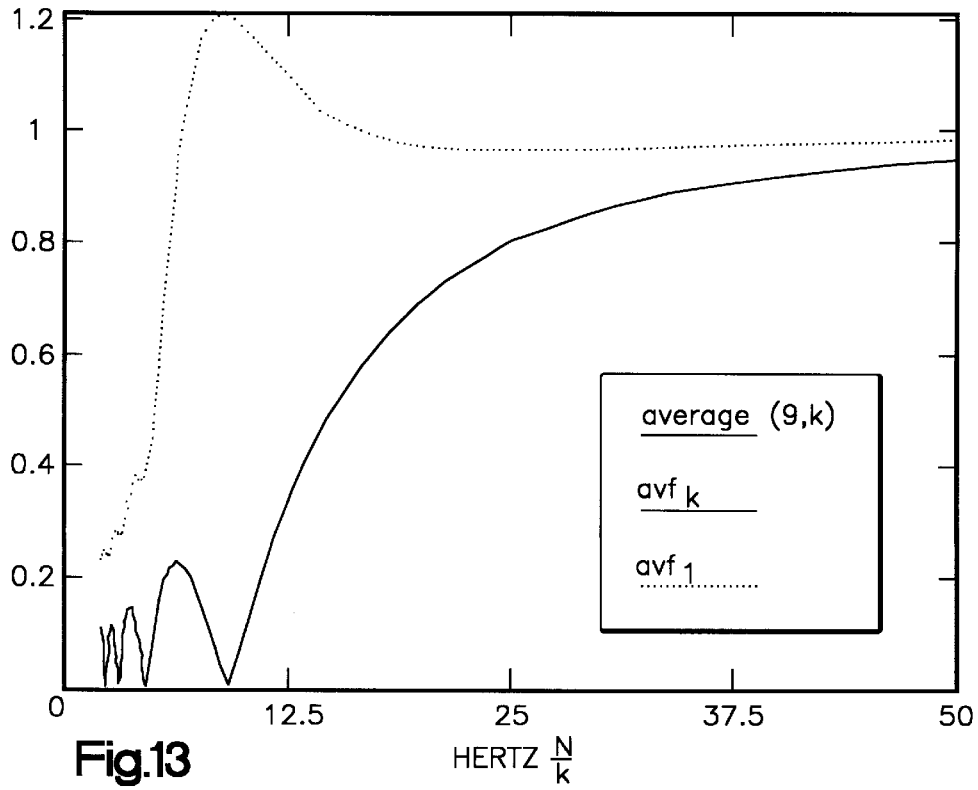
FIG. 13 is a graph of a fourier transform of algorithm (6) with: 1)"M" set to 9 and the "$a_{j,i}$ set to ⅑ (solid) and 2) "M" set to 9 and the "$a_{j,i}$" selected for a more rapid response (dotted)
Figure 14:
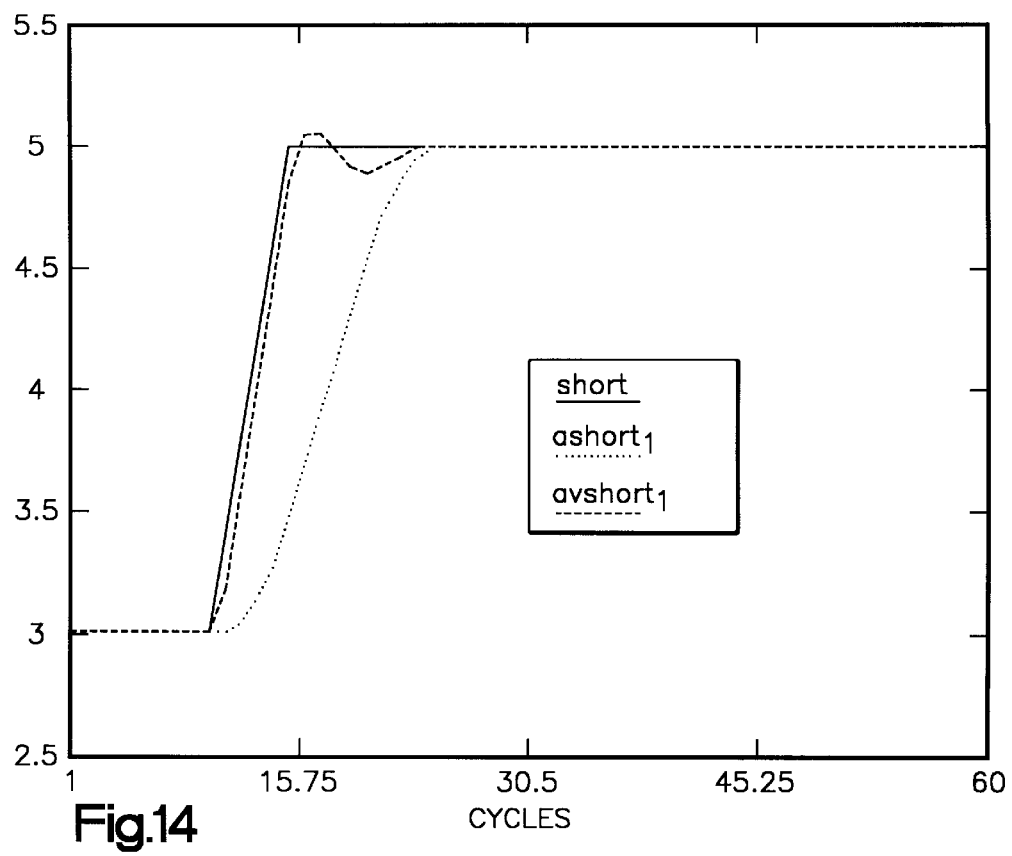
FIG. 14 is a graph of actual current (solid), algorithm (6) with: 1) "M" set to 9 and the "$a_{j,i}$ set to ⅑ (dotted) and 2) "M" set to 9 and the "$a_{j,i}$" selected for a more rapid response (dashed)

FIGS. 6 and 7 illustrate schematically, within a broken-away pictorial context, several examples of environment in which the present invention can be applied.

FIG. 6 illustrates an automotive vehicle 200. The vehicle 200 is of the versatile type often referred to as a "mini-van".

The vehicle 200 has a sunroof which comprises a slidable panel 202, the movement of which opens and closes an aperture 204 in the roof of the forward part of the vehicle cabin.

A motor 206 is coupled to the slidable panel 202 to provide its motion in accordance with the control of the operation of the motor 206. The motor 206 is powered by a battery generally indicated at 208. It is to be understood that the battery 208 can be replaced, where appropriate and convenient, with connection to an external line source of electrical power. Where a vehicle is concerned, representations of the battery are to be considered as representing the coupling of the motor, such as 206, to the main battery powering the entirety of the electrical system of the vehicle 200.

Control of the motor is provided by a control system embodying at least one of the embodiments of the invention as described herein. In FIG. 6, the control system is indicated in schematic form by simply a box 210. It is to be understood that the box 210 includes the control circuitry, including memory and the like, described in one or more of the embodiments of the present invention as set forth in this document.

The vehicle 200 is also provided with power windows, one of which is represented at reference character 220. The power window is operated by an electric motor 222. The motor is supplied with electrical power by way of a battery 224. Control of application of power from the battery 224 to the motor 222 is implemented by the element represented as a box 226.

The vehicle 200 also has a power-driven sliding side door 230, which is illustrated in FIG. 6 as being at least partially open. The sliding door 230 is driven by a motor 232. Electrical power is provided to the motor 232 by a battery 234, which can constitute the vehicle battery. Control of application of electrical power to actuate the motor 232 is provided by control circuitry and memory represented generally by a box 236.

Referring now to FIG. 7, a vehicle 250 is illustrated. The vehicle 250 is a convertible, and has a convertible top generally indicated at reference character 252. An electric motor 254 is mechanically coupled to move the top between its up and down positions. Electrical power to the motor 254 is provided by a battery 256, which, as in other power-driving assemblies in FIGS. 6 and 7, can constitute the vehicle battery. Control is provided by control and memory apparatus generally indicated by the box 258.

The vehicle 250 shown in FIG. 7 also has a pair of power-operated seats 260, 260'. The seats are mechanically coupled to respective electric motors 262, 262', the actuation of which powers the seat motion among various seating positions. Power is provided for the motors 262, 262' by batteries 264, 264', each of which can constitute the vehicle battery. Control of power application to the motors 262, 262' is implemented by circuitry and memory apparatus generally indicated at boxes 266, 266'.

FIG. 7 also illustrates a power-operated garage door 268. The garage door 268 includes a set of interconnected articulated panels, such as indicated at reference character 270. The set of articulated panels rides on a pair of tracks 272, 272'. Movement of the door panels on the tracks is effected by an electric motor 274. Electrical power for operating the motor 274 is provided by a connection 276 to an external line source of electrical power. Alternately, power could be provided to the motor by way of a battery. In stationary installations, however, most of the time it will be found that connection to an external line source is preferable.

Control of the application of power to the motor 274 is provided by circuitry and memory which is generally indicated in FIG. 7 as a box 278. The box 278 contains one or more embodiments of the present invention as described in greater detail above.

Many types of stationary installations involving the application of the present invention are possible. While FIG. 7 shows a power door as a power garage door of an overhead type, it is intended that the invention encompass all types of power doors, such as doors for elevators and the like, and doors for use in industrial applications. Additional industrial application can include machines of many types, including numerically operated machine tools, along with conveyor systems and similar other embodiments.

While the present invention has been described with a degree of particularity it is the intent that the invention include all alterations and modifications from the disclosed design falling within the spirit or scope of the appended claims.

We claim:

1. Apparatus for controlling motion of a motor driven element in a vehicle over a range of motion and for altering said motion when undesirable resistance to said motion is encountered, said apparatus comprising:
    a) a sensor for measuring a parameter of a motor coupled to the motor driven element that varies in response to a resistance to motion during all or part of a range of motion of the power driven element, the sensor taking a multiplicity of discrete measurements as the motor moves the motor driven element over its range of motion;
    b) a memory for storing a number of desired measurement values from the sensor based on measurements of said parameter over at least a portion of said range of motion;
    c) comparator means for determining whether a subsequently measured parameter value falls outside a threshold parameter range bounding the desired measurement values for the parameter as the motor driven element moves over its range of motion, values of the threshold parameter range varying with a position of the motor driven element over said range of motion or an elapsed time of movement of the motor driven element from commencement of motion of the motor driven element or a speed of movement of the motor driven element over said range of motion, the threshold parameter range values being determined for a selected one of:
       1) a multiplicity of positions of the power driven element over at least a portion of said range of motion, a threshold parameter range value for a given position of the motor driven element being based on desired measurement values stored in memory corresponding to the given position of the motor driven element;
       2) a multiplicity of elapsed times of movement of the motor driven element from commencement of motion of the motor driven element, a threshold parameter range value for a given elapsed time of movement of the motor driven element from commencement of motion being based on desired measurement values stored in memory corresponding to the given elapsed time of movement of the motor driven element; and
       3) a multiplicity of speeds of movement of the power driven element over at least a portion of said range of motion, a threshold parameter range value for a given speed of the motor-driven element being based on desired measurement values stored in memory corresponding to the given speed of the motor driven element;
    d) a controller coupled to the comparator means for altering motion of said motor driven element in response to a determination from said comparator means; and
    e) said motor driven element comprising a window and the memory comprising memory means to store a multiplicity of predetermined desired measurement values for a fixed size threshold parameter range.

2. The apparatus of claim 1 where said memory comprises memory means to store and/or generate desired measurement values for a multiplicity of threshold parameter ranges where:
    a) said multiplicity of threshold parameter ranges have been determined from a combination of said measured values from past and/or present motions of said device; and
    b) said multiplicity of threshold parameter ranges generally correspond to said multiplicity of measured values in terms of relationship to said motion.

3. The apparatus of claim 2 where the determination of threshold parameter ranges uses a combination of past and present differences between desired and actual measurement values comprising:
    a) an estimation related to the standard deviation or variability of the distribution of the differences between the desired and actual measurement values;

b) multiplication of said estimation by a predetermined upper and/or lower scale factor to produce the parameter ranges; and c) comparison of said produced parameter ranges to predetermined extreme values and adjustment of said produced parameter ranges not to exceed said predetermined extreme values.

4. The apparatus of claim 1, further comprising apparatus and circuitry for sensing closure of said motor driven element.

5. The apparatus of claim 1 where said controller produces said desired values by low pass filtering across previous cycles of said measurements.

6. The apparatus of claim 5 where said measured values are low pass filtered by the controller before being processed to produce said desired values before being compared to said desired values.

7. The apparatus of claim 1, where the presence of an abnormality such as an obstruction is inferred by the controller when a predetermined number "g" of consecutive measurements of said parameter fall outside said respective threshold parameter range for said measurements where "g" can be one or greater than one.

8. The apparatus of claim 1 where the presence of an abnormality such as an obstruction is inferred by the controller when a first number "g" of consecutive measurements of said parameter fall outside a first desirable threshold parameter range for said measurements and/or when a second number "r" of consecutive measurements of said parameter fall outside a second desirable threshold parameter range for said measurements where "g" and/or "r" can be one or greater than one.

9. The apparatus of claim 1 further comprising:
an electrically operated brake and circuitry for actuating said brake in response to detection of said undesirable resistance.

10. The apparatus of claim 1 wherein said parameter is current in an electric motor coupled for moving said motor driven element, said current being measured at intervals of a position of the motor driven element over at least a portion of said range of motion.

11. The apparatus of claim 1 wherein said parameter is current in an electric motor coupled to said motor driven element for moving said motor driven element, said current being measured at intervals of time from commencement of motion of the motor driven element.

12. The apparatus of claim 1 wherein said parameter is current in an electric motor coupled to said motor driven element for moving said motor driven element, said current being measured at intervals of speed of said motion of the motor driven element.

13. The apparatus of claim 1 wherein said parameter is speed of said motion of the motor driven element and is measured at intervals of a position of the motor driven element over at least a portion of said range of motion.

14. The apparatus of claim 1 wherein said parameter is speed of said motion of the motor driven element and is measured at intervals of time from commencement of motion of the motor driven element.

15. Apparatus for controlling motion of a motor driven element in a vehicle over a range of motion and for altering said motion when undesirable resistance to said motion is encountered, said apparatus comprising:

a) a sensor for measuring a parameter of a motor coupled to the motor driven element that varies in response to a resistance to motion during all or part of a range of motion of the power driven element, the sensor taking a multiplicity of discrete measurements as the motor moves the motor driven element over its range of motion;

b) a memory for storing a number of desired measurement values from the sensor based on measurements of said parameter over at least a portion of said range of motion;

c) comparator means for determining whether a subsequently measured parameter value falls outside a threshold parameter range bounding the desired measurement values for the parameter as the motor driven element moves over its range of motion, values of the threshold parameter range varying with a position of the motor driven element over said range of motion or an elapsed time of movement of the motor driven element from commencement of motion of the motor driven element or a speed of movement of the motor driven element over said range of motion, the threshold parameter range values being determined for a selected one of:

1) a multiplicity of positions of the power driven element over at least a portion of said range of motion, a threshold parameter range value for a given position of the motor driven element being based on desired measurement values stored in memory corresponding to the given position of the motor driven element;

2) a multiplicity of elapsed times of movement of the motor driven element from commencement of motion of the motor driven element, a threshold parameter range value for a given elapsed time of movement of the motor driven element from commencement of motion being based on desired measurement values stored in memory corresponding to the given elapsed time of movement of the motor driven element; and 3) a multiplicity of speeds of movement of the power driven element over at least a portion of said range of motion, a threshold parameter range value for a given speed of the motor driven element being based on desired measurement values stored in memory corresponding to the given speed of the motor driven element;

d) a controller coupled to the comparator means for altering motion of said motor driven element in response to a determination from said comparator means;

e) said memory for storing desired measurement values comprises memory means to store and/or generate said multiplicity of desired measurement values where said multiplicity of desired measurement values have been determined from a combination of said measurement values from Past and recently sensed motions of said motor driven element; and f) where said measured values are high pass filtered by the controller before being processed to produce said desired values before being compared to said desired values.

16. Apparatus for controlling motion of a motor driven element in a vehicle over a range of motion and for altering said motion when undesirable resistance to said motion is encountered, said apparatus comprising:

a) a sensor for measuring a parameter of a motor coupled to the motor driven element that varies in response to a resistance to motion during all or part of a range of motion of the power driven element, the sensor taking a multiplicity of discrete measurements as the motor moves the motor driven element over its range of motion;

b) a memory for storing a number of desired measurement values from the sensor based on measurements of said parameter over at least a portion of said range of motion;

c) comparator means for determining whether a subsequently measured parameter value falls outside a threshold parameter range bounding the desired measurement values for the parameter as the motor driven element moves over its range of motion, values of the threshold parameter range varying with a position of the motor driven element over said range of motion or an elapsed time of movement of the motor driven element from commencement of motion of the motor driven element or a speed of movement of the motor driven element over said range of motion, the threshold parameter range values being determined for a selected one of:

1) a multiplicity of positions of the power driven element over at least a portion of said range of motion, a threshold parameter range value for a given position of the motor driven element being based on desired measurement values stored in memory corresponding to the given position of the motor driven element;

2) a multiplicity of elapsed times of movement of the motor driven element from commencement of motion of the motor driven element, a threshold parameter range value for a given elapsed time of movement of the motor driven element from commencement of motion being based on desired measurement values stored in memory corresponding to the given elapsed time of movement of the motor driven element; and 3) a multiplicity of speeds of movement of the power driven element over at least a portion of said range of motion, a threshold parameter range value for a given speed of the motor driven element being based on desired measurement values stored in memory corresponding to the given speed of the motor driven element;

d) a controller coupled to the comparator means for altering motion of said motor driven element in response to a determination from said comparator means;

e) said memory for storing desired measurement values comprises memory means to store and/or generate said multiplicity of desired measurement values where said multiplicity of desired measurement values have been determined from a combination of said measurement values from past and recently sensed motions of said motor driven element; and f) where said measured values are bandpass filtered by the controller before being processed to produce said desired values before being compared to said desired values.

17. Apparatus for controlling motion of a motor driven element in a vehicle over a range of motion and for altering said motion when undesirable resistance to said motion is encountered, said apparatus comprising:

a) a sensor for measuring a parameter of a motor coupled to the motor driven element that varies in response to a resistance to motion during all or part of a range of motion of the power driven element, the sensor taking a multiplicity of discrete measurements as the motor moves the motor driven element over its range of motion;

b) a memory for storing a number of desired measurement values from the sensor based on measurements of said parameter over at least a portion of said range of motion;

c) comparator means for determining whether a subsequently measured parameter value falls outside a threshold parameter range bounding the desired measurement values for the parameter as the motor driven element moves over its range of motion, values of the threshold parameter range varying with a position of the motor driven element over said range of motion or an elapsed time of movement of the motor driven element from commencement of motion of the motor driven element or a speed of movement of the motor driven element over said range of motion, the threshold parameter range values being determined for a selected one of:

1) a multiplicity of positions of the power driven element over at least a portion of said range of motion, a threshold parameter range value for a given position of the motor driven element being based on desired measurement values stored in memory corresponding to the given position of the motor driven element;

2) a multiplicity of elapsed times of movement of the motor driven element from commencement of motion of the motor driven element, a threshold parameter range value for a given elapsed time of movement of the motor driven element from commencement of motion being based on desired measurement values stored in memory corresponding to the given elapsed time of movement of the motor driven element; and 3) a multiplicity of speeds of movement of the power driven element over at least a portion of said range of motion, a threshold parameter range value for a given speed of the motor driven element being based on desired measurement values stored in memory corresponding to the given speed of the motor driven element;

d) a controller coupled to the comparator means for altering motion of said motor driven element in response to a determination from said comparator means;

e) said memory for storing desired measurement values comprises memory means to store and/or generate said multiplicity of desired measurement values where said multiplicity of desired measurement values have been determined from a combination of said measurement values from past and recently sensed motions of said motor driven element; and f) where said measured values are matches filtered by the processor before being processed to produce said desired values before being compared to said desired values where said matches filter has an emphasized response to an undesired motor load profile variation.

18. Apparatus for controlling motion of a motor driven element in a vehicle over a range of motion and for altering said motion when undesirable resistance to said motion is encountered, said apparatus comprising:

a) a sensor for measuring a parameter of a motor coupled to the motor driven element that varies in response to a resistance to motion during all or part of a range of motion of the power driven element, the sensor taking a multiplicity of discrete measurements as the motor moves the motor driven element over its range of motion;

b) a memory for storing a number of desired measurement values from the sensor based on measurements of said parameter over at least a portion of said range of motion;

c) comparator means for determining whether a subsequently measured parameter value falls outside a threshold parameter range bounding the desired measurement values for the parameter as the motor driven element moves over its range of motion, values of the threshold parameter range varying with a position of the motor driven element over said range of motion or an elapsed time of movement of the motor driven element from commencement of motion of the motor driven element or a speed of movement of the motor driven element over said range of motion, the threshold parameter range values being determined for a selected one of:

1) a multiplicity of positions of the power driven element over at least a portion of said range of motion, a threshold parameter range value for a given position of the motor driven element being based on desired measurement values stored in memory corresponding to the given position of the motor driven element;

2) a multiplicity of elapsed times of movement of the motor driven element from commencement of motion of the motor driven element, a threshold parameter range value for a given elapsed time of movement of the motor driven element from commencement of motion being based on desired measurement values stored in memory corresponding to the given elapsed time of movement of the motor driven element; and 3) a multiplicity of speeds of movement of the power driven element over at least a portion of said range of motion, a threshold parameter range value for a given speed of the motor driven element being based on desired measurement values stored in memory corresponding to the given speed of the motor driven element;

d) a controller coupled to the comparator means for altering motion of said motor driven element in response to a determination from said comparator means;

e) said memory for storing desired measurement values comprises memory means to store and/or generate said multiplicity of desired measurement values where said multiplicity of desired measurement values have been determined from a combination of said measurement values from past and recently sensed motions of said motor driven element; and f) where said first number "g" of consecutive measurements and said second number "r" of consecutive measurements are processed by first and second filters to produce a first and second set of filtered measurements where:

a) said first and second sets of filtered measurements are processed with past filtered measurements to produce a first and second set of desired filtered measurements;

b) first and second sets of threshold parameter ranges for said first and second sets of filtered measurements are stored or generated; and c) said first and second sets of filtered measurements are compared to said first and second sets of desired filtered measurements, respectively, to determine if part of said first or second sets of filtered measurements fall outside of said first or second sets of threshold parameter ranges, respectively.

19. A method for controlling motion of a motor driven element in a vehicle over a range of motion of the motor driven element and for altering said motion when undesirable resistance to said motion is encountered, said method comprising the steps of:

a) measuring a parameter that varies in response to a resistance to motion during all or part of a range of motion of the motor driven element;

b) storing a number of desired measurement values based on measurements of said parameter over at least a portion of said range of motion;

c) determining whether a subsequently measured value falls outside a threshold parameter range bounding the desired values for the parameter as the motor driven element moves over its range of motion, wherein values of the threshold parameter range vary with a position of the motor driven element over said range of motion or an elapsed time of movement of the motor driven element from commencement of motion of the motor driven element or a speed of the motor driven element over said range of motion, the threshold parameter range values being determined for a selected one of:

1) a multiplicity of positions of the power driven element over at least a portion of said range of motion, a threshold parameter range value for a given position of the motor driven element being based on desired measurement values stored in memory corresponding to the given position of the motor driven element;

2) a multiplicity of elapsed times of movement of the motor driven element from commencement of motion of the motor driven element, a threshold parameter range value for a given elapsed time of movement of the motor driven element from commencement of motion being based on desired measurement values stored in memory corresponding to the given elapsed time of movement of the motor driven element; and 3) a multiplicity of speeds of the power driven element over at least a portion of said range of motion, a threshold parameter range value for a given speed of the motor driven element being based on desired measurement values stored in memory corresponding to the given speed of the motor driven element; and d) altering the motion of said power driven element in response to a determination from said determining step; where the motor driven element comprises a window or panel and where said memory stores and/or generates desired measurement values for a multiplicity of threshold ranges where:

1) said multiplicity of threshold ranges have been determined from a combination of said measured values from past and/or present motions of said window or panel; and 2) said multiplicity of threshold ranges generally correspond to said multiplicity of measured values in terms of relationship to said motion.

20. The method of claim 19 wherein a multiplicity of discrete measurements of the parameter are taken as the motor driven element moves over its range of motion.

21. The method of claim 20 where said memory for storing desired measurement values stores a multiplicity of predetermined fixed parameter values that generally correspond to said multiplicity of discrete measurements.

22. The method of claim 20 where said memory for storing desired measurement values stores and/or generates said multiplicity of desired measurement values based on a combination of said measurement values from past and recently sensed motions of said device.

23. The method claim 19 where said motor driven element comprises a window and wherein the memory stores a multiplicity of predetermined desired measurement values for a given size threshold range.

24. The method of claim 19 where the determination of threshold windows uses a combination of past and present differences between desired and actual measurement values comprising:
  a) an estimation related to the standard deviation or variability of the distribution of the differences between the desired and actual measurement values;
  b) multiplication of said estimation by a predetermined upper and/or lower scale factor to produce the threshold ranges; and
  c) comparison of said produced threshold ranges to predetermined extreme values and adjustment of said produced threshold ranges not to exceed said predetermined extreme values.

25. Apparatus for controlling motion of a motor driven element in a vehicle over a range of motion and for altering said motion when undesirable resistance to said motion is encountered, said apparatus comprising:
  a) a sensor for measuring a parameter of a motor coupled to the motor driven element that varies in response to a resistance to motion during all or part of a range of motion of the motor driven element;
  b) a memory for storing a number of desired measurement values from the sensor based on measurements of said parameter over at least a portion of said range of motion;
  c) comparator means for determining whether subsequently measured values fall outside a threshold parameter range bounding the desired values for the parameter as the motor driven element moves over its range of motion;
  d) a controller coupled to the comparator means for altering motion of said motor driven element in response to a determination from said comparator means;
  e) where said sensor takes a multiplicity of discrete measurements as the motor moves the motor driven element over its range of motion; and
  f) where said motor driven element comprises a window and wherein the memory comprises memory means to store a multiplicity of predetermined desired measurement values for a fixed size threshold parameter range.

26. The apparatus of claim 25 where said memory comprises memory means to store and/or generate desired measurement values for a multiplicity of threshold parameter ranges where:
  a) said multiplicity of threshold parameter ranges have been determined from a combination of said measured values from past and/or present motions of said device; and
  b) said multiplicity of threshold parameter ranges generally correspond to said multiplicity of measured values in terms of relationship to said motion.

27. The apparatus of claim 26 where the determination of threshold parameter ranges uses a combination of past and present differences between desired and actual measurement values comprising:
  a) an estimation related to the standard deviation or variability of the distribution of the differences between the desired and actual measurement values;
  b) multiplication of said estimation by a predetermined upper and/or lower scale factor to produce the windows; and
  c) comparison of said produced windows to predetermined extreme values and adjustment of said produced windows not to exceed said predetermined extreme values.

28. Apparatus for controlling motion of a motor driven element in a vehicle over a range of motion and for altering said motion when undesirable resistance to said motion is encountered, said apparatus comprising:
  a) a sensor for measuring a parameter of a motor coupled to the motor driven element that varies in response to a resistance to motion during all or part of a range of motion of the motor driven element;
  b) a memory for storing a number of desired measurement values from the sensor based on measurements of said parameter over at least a portion of said range of motion;
  c) comparator means for determining whether subsequently measured values fall outside a threshold parameter range bounding the desired values for the parameter as the motor driven element moves over its range of motion;
  d) a controller coupled to the comparator means for altering motion of said motor driven element in response to a determination from said comparator means;
  e) where said sensor takes a multiplicity of discrete measurements as the motor moves the motor driven element over its range of motion;
  f) where said memory for storing desired measurement values comprises memory means to store and/or generate said multiplicity of desired measurement values where:
    said multiplicity of desired measurement values have been determined from a combination of said measurement values from past and recently sensed motions of said motor driven element;
  g) where said controller produces said desired values by low pass filtering across previous cycles of said measurements; and
  h) where said measured values are high pass filtered by the controller before being processed to produce said desired values before being compared to said desired values.

29. Apparatus for controlling motion of a motor driven element in a vehicle over a range of motion and for altering said motion when undesirable resistance to said motion is encountered, said apparatus comprising:
  a) a sensor for measuring a parameter of a motor coupled to the motor driven element that varies in response to a resistance to motion during all or part of a range of motion of the motor driven element;
  b) a memory for storing a number of desired measurement values from the sensor based on measurements of said parameter over at least a portion of said range of motion;

c) comparator means for determining whether subsequently measured values fall outside a threshold parameter range bounding the desired values for the parameter as the motor driven element moves over its range of motion;

d) a controller coupled to the comparator means for altering motion of said motor driven element in response to a determination from said comparator means;

e) where said sensor takes a multiplicity of discrete measurements as the motor moves the motor driven element over its range of motion;

f) where said memory for storing desired measurement values comprises memory means to store and/or generate said multiplicity of desired measurement values where:

said multiplicity of desired measurement values have been determined from a combination of said measurement values from past and recently sensed motions of said motor driven element;

g) where said controller produces said desired values by low pass filtering across previous cycles of said measurements; and h) where said measured values are bandpass filtered by the controller before being processed to produce said desired values before being compared to said desired values.

30. Apparatus for controlling motion of a motor driven element in a vehicle over a range of motion and for altering said motion when undesirable resistance to said motion is encountered, said apparatus comprising:

a) a sensor for measuring a parameter of a motor coupled to the motor driven element that varies in response to a resistance to motion during all or part of a range of motion of the motor driven element;

b) a memory for storing a number of desired measurement values from the sensor based on measurements of said parameter over at least a portion of said range of motion;

c) comparator means for determining whether subsequently measured values fall outside a threshold parameter range bounding the desired values for the parameter as the motor driven element moves over its range of motion;

d) a controller coupled to the comparator means for altering motion of said motor driven element in response to a determination from said comparator means;

e) where said sensor takes a multiplicity of discrete measurements as the motor moves the motor driven element over its range of motion;

f) where said memory for storing desired measurement values comprises memory means to store and/or generate said multiplicity of desired measurement values where:

said multiplicity of desired measurement values have been determined from a combination of said measurement values from past and recently sensed motions of said motor driven element;

g) where said controller produces said desired values by low pass filtering across previous cycles of said measurements; and h) where said measured values are matches filtered by the processor before being processed to produce said desired values before being compared to said desired values where said matches filter has an emphasized response to an undesired motor load profile variation.

31. A method for controlling motion of a motor driven element in a vehicle over a range of motion of the motor driven element and for altering said motion when undesirable resistance to said motion is encountered, said method comprising the steps of:

a) measuring a parameter that varies in response to a resistance to motion during all or part of a range of motion of the motor driven element;

b) storing a number of desired measurement values based on measurements of said parameter over at least a portion of said range of motion;

c) determining whether subsequently measured values fall outside a threshold parameter range bounding the desired values for the parameter as the motor driven element moves over its range of motion;

d) altering the motion of said motor driven element in response to a determination from said determining step;

where the motor driven element comprises a window or panel and where said memory stores and/or generates desired measurement values for a multiplicity of threshold parameter ranges where:

1) said multiplicity of threshold ranges have been determined from a combination of said measured values from past and/or present motions of said window or panel; and 2) said multiplicity of threshold ranges generally correspond to said multiplicity of measured values in terms of relationship to said motion.

32. The method of claim 31 where the determination of threshold windows uses a combination of past and present differences between desired and actual measurement values comprising:

a) an estimation related to the standard deviation or variability of the distribution of the differences between the desired and actual measurement values;

b) multiplication of said estimation by a predetermined upper and/or lower scale factor to produce the threshold ranges; and c) comparison of said produced windows to predetermined extreme values and adjustment of said produced threshold ranges not to exceed said predetermined extreme values.

* * * * *